United States Patent [19]

Tzikas et al.

[11] Patent Number: 4,818,247
[45] Date of Patent: Apr. 4, 1989

[54] REACTIVE AZO DYES CARRYING TWO AMINE-FLUORO-TRIAZINYL GROUPS FOR DYEING AND PRINTING COTTON

[75] Inventors: Athanassios Tzikas, Pratteln; Adolf Käser, Bottmingen, both of Switzerland

[73] Assignee: Ciba-Geigy Corporation, Ardsley, N.Y.

[21] Appl. No.: 53,526

[22] Filed: May 21, 1987

Related U.S. Application Data

[63] Continuation of Ser. No. 835,586, Mar. 3, 1986, abandoned, which is a continuation of Ser. No. 767,247, Aug. 20, 1985, abandoned, which is a continuation of Ser. No. 618,691, Jun. 8, 1984, abandoned.

[30] Foreign Application Priority Data

Jun. 10, 1983 [CH] Switzerland .................. 3187/83

[51] Int. Cl.⁴ .................. C09B 62/08; D06P 3/66
[52] U.S. Cl. .................. 8/549; 8/681; 8/684; 8/687; 8/688; 8/918; 534/632; 534/634; 534/635; 534/637; 534/638
[58] Field of Search .............. 534/632, 634, 637, 638, 534/635; 8/548, 684

[56] References Cited

U.S. PATENT DOCUMENTS 4,540,776  9/1985  Henk et al. .................. 534/635

FOREIGN PATENT DOCUMENTS 1263083   2/1972  United Kingdom .
1542773   3/1979  United Kingdom .
2023161  12/1979  United Kingdom .

Primary Examiner—A. Lionel Clingman
Attorney, Agent, or Firm—Edward McC. Roberts; Meredith C. Findlay

[57] ABSTRACT

Reactive dyes of the formula

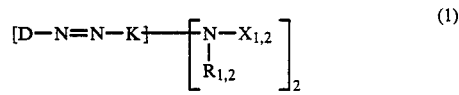

in which D is the radical of a diazo component of the benzene, naphthalene, azobenzene, naphthylazobenzene, azonaphthalene or phenylazonaphthalene series, K is the radical of a coupling component of the benzene or naphthalene series or of the heterocyclic series, except a pyrazolone radical, $R_1$ and $R_2$, independently of each other, are each hydrogen or an unsubstituted or substituted $C_{1-4}$-alkyl radical, and $X_1$ and $X_2$, independently of each other, are each unsubstituted or substituted aminofluoro-s-triazinyl, are particularly suitable for dyeing and printing cellulose-containing fibre materials and produce, in high dyeing yield, dyeings and prints having good fastness properties.

17 Claims, No Drawings

REACTIVE AZO DYES CARRYING TWO AMINE-FLUORO-TRIAZINYL GROUPS FOR DYEING AND PRINTING COTTON

This application is a continuation of Ser. No. 835,586 filed Mar. 3, 1986, abandoned, which is a continuation of Ser. No. 767,247 filed Aug. 20, 1985, abandoned which is a continuation of Ser. No. 618,691 filed June 8, 1984, abandoned.

The present invention relates to novel reactive dyes, to a process for their preparation, and to their use for dyeing or printing fibre materials.

The practice of dyeing with reactive dyes has in recent years led to increased demands on the quality of the dyeings and the economics of the dyeing process. There consequently continues to be a demand for novel reactive dyes which have improved properties, in particular application properties.

It is the object of the present invention to provide novel, improved reactive dyes which dye cotton in yellow, orange or red shades. The novel dyes shall be distinguished in particular by high degrees of fixation and high fibre-dye bond stabilities, they shall be particularly suitable for dyeing by the exhaust method and the cold pad-batch method and also for printing, and the unfixed dye portions of the fibre shall be easily washed off.

Furthermore, the dyeings and prints obtainable with the novel dyes shall have good all-around fastness properties, for example light and wet fastness properties.

These objects are achieved with the novel bireactive dyes defined hereinafter which contain two terminal aminofluoro-1,3,5-triazinyl radicals.

The invention accordingly provides reactive dyes of the formula

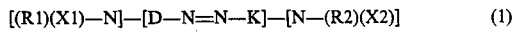

$$[(R_1)(X_1)—N]—[D—N=N—K]—[N—(R_2)(X_2)] \quad (1)$$

in which D is the radical of a diazo component of the benzene, naphthalene, azobenzene, naphthylazobenzene, azonaphthalene or phenylazonaphthalene series, K is the radical of a coupling component of the benzene or naphthalene series or of the heterocyclic series, except a pyrazolone radical, $R_1$ and $R_2$, independently of each other, are each hydrogen or an unsubstituted or substituted $C_{1-4}$-alkyl radical, and $X_1$ and $X_2$, independently of each other, are each unsubstituted or substituted aminofluoro-s-triazinyl.

The radicals D and K in the formula (1) can be further substituted, for example by alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, alkanoylamino groups having 1 to 4 carbon atoms, such as acetylamino or propionylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfonamoy, ureido, hydroxyl, carboxyl, sulfomethyl or sulfo. Preferred are the substituents methyl, ethyl, methoxy, ethoxy, acetylamino, chlorine, bromine, ureido, hydroxyl, carboxyl, sulfomethyl and in particular sulfo.

The radicals D and K in the formula (1) can contain as substituents further cyclic radicals which are bonded to the basic structures of D and K defined above underneath the formula (1), directly or via a bridge member such as —O—, —CO—, —CH$_2$—, —CH$_2$CH$_2$—, —NH—CO—NH—, —SO$_2$—, —NH— or —NH—CO—, or are fused to said basic structures. In this case the radicals —N(R$_1$)—X$_1$ and/or —N(R$_2$)—X$_2$ can also be bonded to those cyclic substituents. The cyclic substituents themselves can be further substituted, for example by $C_{1-4}$-alkyl, $C_{1-4}$-alkoxy, halogen, carboxyl, sulfo and the like, as stated above in the explanation of possible substituents of D and K. A cyclic substituent to which the reactive radical is bonded is given for example when 4,4'-diaminobiphenyl, 4,4'-diaminodiphenyl ether or a 1-amino-4-(aminonaphtho[1,2-d]triazol-2-yl)benzene-2-sulfonic acid is used as the diazo component or when an aminobenzoyl-H- or -K-acid is used as the coupling component.

Alkyl radicals $R_1$ and $R_2$ are straight-chain or branched; they can be further substituted, for example by halogen, hydroxyl, cyano, $C_{1-4}$-alkoxy, carboxyl or sulfo. Examples of $R_1$ and $R_2$ are the following radicals: methyl, ethyl, propyl, isopropyl, butyl, isobutyl, sec.-butyl, tert.-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, aminosulfonylmethyl and β-sulfatoethyl. Preferably $R_1$ and $R_2$ are independently of each other hydrogen or methyl.

The unsubstituted or substituted amino groups in the fluoro-1,3,5-triazinyl radicals $X_1$ and $X_2$ can be —NH$_2$, alkylamino, N,N-dialkylamino, cycloalkylamino, N,N-dicycloalkylamino, aralkylamino or arylamino groups, mixed-substituted amino groups, such as N-alkyl-N-cyclohexylamino and N-alkyl-N-arylamino groups, and also amino groups which contain heterocyclic radicals which can have further fused-on carbocyclic rings, as well as amino groups in which the amino nitrogen atom is the member of an N-heterocyclic ring which can contain further hetero atoms. The abovementioned alkyl radicals can be straight-chain or branched or be of low molecular weight or high molecular weight, preferred alkyl radicals having 1 to 6 carbon atoms; suitable as cycloalkyl, aralkyl and aryl radicals are in particular cyclohexyl, benzyl, phenethyl, phenyl and naphthyl radicals; heterocyclic radicals are especially furan, thiophene, pyrazole, pyridine, pyrimidine, quinoline, benzimidazole, benzothiazole and benzoxazole radicals; and amino groups in which the amino nitrogen atom is a member of an N-heterocyclic ring are preferably radicals of six-membered N-heterocyclic compounds which can contain nitrogen, oxygen or sulfur as further hetero atoms. The abovementioned alkyl, cycloalkyl, aralkyl and aryl radicals, the heterocyclic radicals and the N-heterocyclic rings can be further substituted, for example by halogen, such as fluorine, chlorine and bromine, nitro, cyano, trifluoromethyl, sulfamoyl, carbamoyl, $C_{1-4}$-alkyl, $C_{1-4}$-alkoxy, acylamino groups, such as acetylamino or benzoylamino, ureido, hydroxyl, carboxyl, sulfomethyl or sulfo. Examples of such amino groups are —NH$_2$, methylamino, ethylamino, propylamino, isopropylamino, butylamino, hexylamino, β-methoxyethylamino, γ-methoxypropylamino, β-ethoxyethylamino, N,N-dimethylamino, N,N-diethylamino, β-chloroethylamino, β-cyanoethylamino, γ-cyanopropylamino, β-carboxyethylamino, sulfomethylamino, β-sulfoethylamino, β-hydroxyethylamino, N,N-di-β-hydroxyethylamino, γ-hydroxypropylamino, benzylamino, phenethylamino, cyclohexylamino, phenylamino, toluidino, xylidino, chloroanilino, anisidino, phenetidino, N-methyl-N-phenylamino, N-ethyl-N-phenylamino, N-β-hydroxyethyl-N-phenylamino, 2-, 3- or 4-sulfoanilino, 2,5-disulfoanilino, 4-sulfomethylanilino, N-sulfomethylanilino, 2-, 3- or 4-carboxyphenylamino, 2-carboxy-5-sulfophenylamino, 2-carboxy-4-sulfophenylamino, 4-sulfonaphth-1-ylamino, 3,6-disulfonaphth-1-ylamino, 3,6,8-trisulfonaphth-1-ylamino, 4,6,8-trisulfonaphth-1-ylamino, 1-sulfonaphth-2-ylamino, 1,5-disulfonaphth-2-ylamino, 6-sulfonaphth-2-ylamino, morpholino, piperadino and piperazino.

The triazinylamino radicals —N(R₁)—X₁ and —(R₂)—X₂ in the formula (1) are bonded to different or identical radicals of starting components, namely D and K. The radicals —N(R₁)—X₁ and —N(R₂)—X₂ are preferably bonded one each to the two radicals D and K. In this case the reactive dyes have the formula

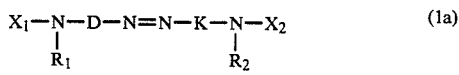 (1a)

If the two radicals —N(R₁)—X₁ and —N(R₂)—X₂ are bonded to the same radical of a starting component, namely D or K, this radical is in particular the radical of coupling component K. The reactive dyes have the formula

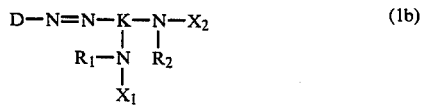 (1b)

In the above formulae (1a) and (1b) the symbols D, K, R₁, R₂, X₁ and X₂ are defined in the same way as under the formula (1).

Consideration must also go to reactive dyes of the formula (1a) in which the radical D or K includes a further reactive radical and to reactive dyes of the formula (1b) in which the radical D includes a further reactive radical. Trireactive and tetrareactive dyes are thus also covered. The additional reactive radicals enclosed in D or K can be bonded to the basic structure of D or K via amino groups, like X₁ and X₂, or in some other way, for example by a direct bond.

Preference goes to reactive dyes of the formula (1) in which X₁ and X₂, independently of each other, are each a radical of the formula

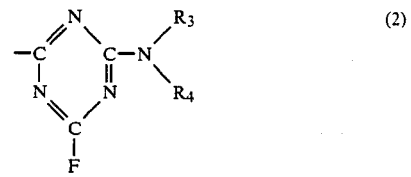 (2)

in which $R_3$ and $R_4$, independently of each other, are each hydrogen, $C_{1-4}$-alkyl which is unsubstituted or substituted by halogen, cyano, $C_{1-4}$-alkoxy, hydroxyl, carboxyl, sulfo or sulfato, benzyl, phenethyl, cyclohexyl, phenyl which is unsubstituted or substituted by halogen, nitro, cyano trifluoromethyl, sulfamoyl, carbamoyl, $C_{1-4}$-alkyl, $C_{1-4}$-alkoxy, $C_{1-4}$-alkanoylamino, benzoylamino, ureido, hydroxyl, carboxyl, sulfomethyl or sulfo, or naphthyl which is unsubstituted or substituted by halogen, nitro, $C_{1-4}$-alkoxy, $C_{1-4}$-alkanoylamino, hydroxyl, carboxyl or sulfo, or in which $R_3$ and $R_4$, together with the amino nitrogen atom, are a morpholino, piperidino or piperazino radical.

Particular preference goes to reactive dyes of the formula

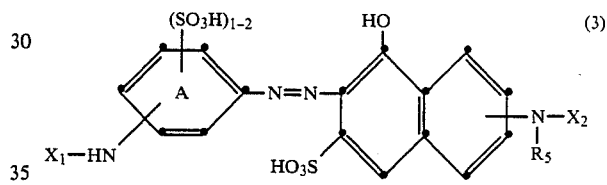 (3)

in which $R_5$ is hydrogen or $C_{1-4}$-alkyl, $X_1$ and $X_2$ are as defined under the formula (2), and the benzene ring A can be further substituted; and to reactive dyes of the formula

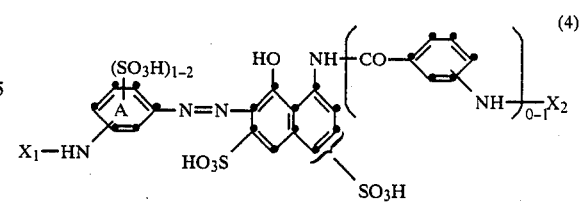 (4)

in which $X_1$ and $X_2$ are as defined under the formula (2), and the A benzene ring can be further substituted.

Further useful representatives are the reactive dyes of the following formulae:

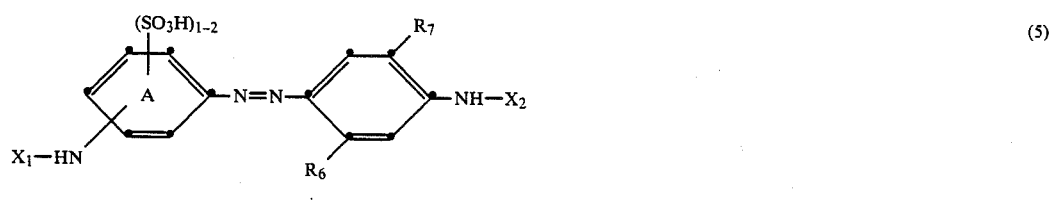 (5)

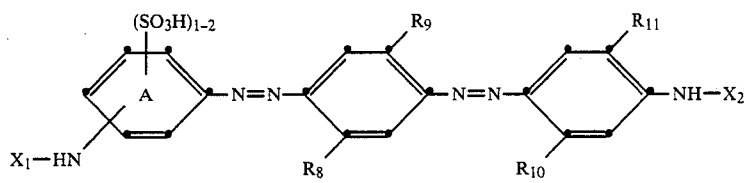
(6)
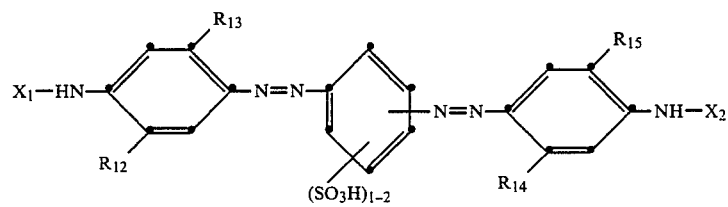
(7)
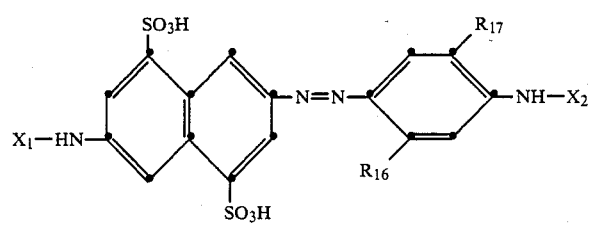
(8)
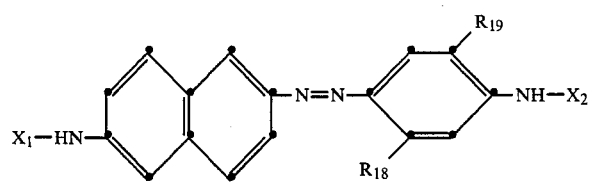
(9)
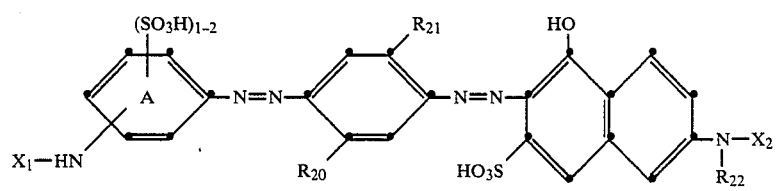
(10)
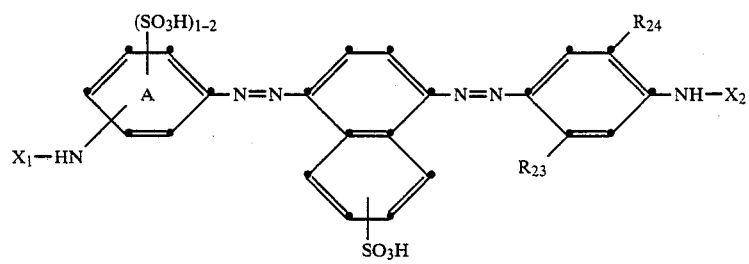
(11)
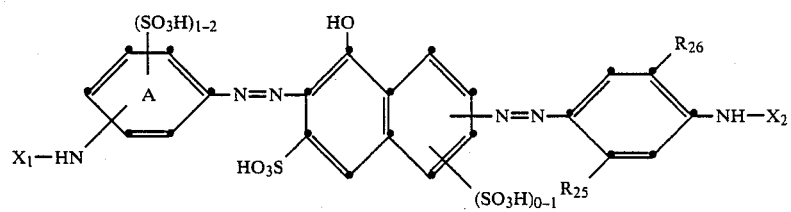
(12)

-continued
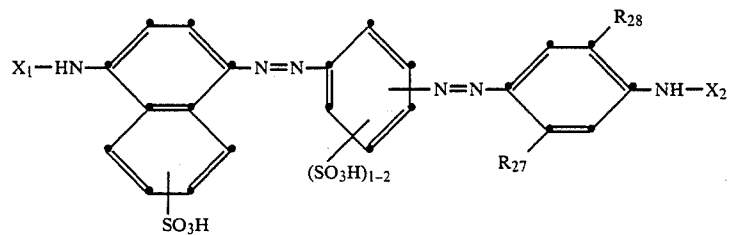 (13)
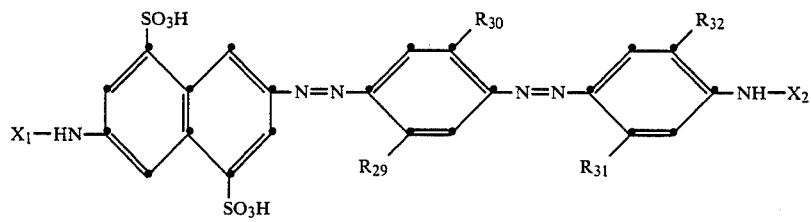 (14)
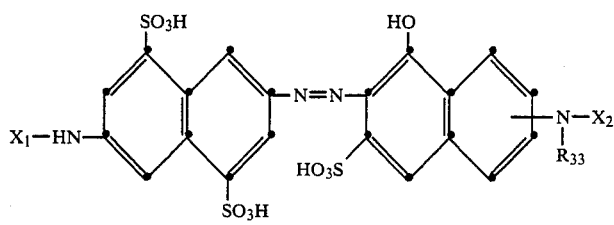 (15)
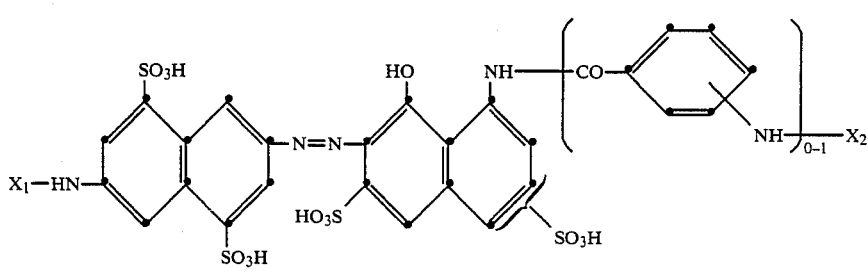 (16)
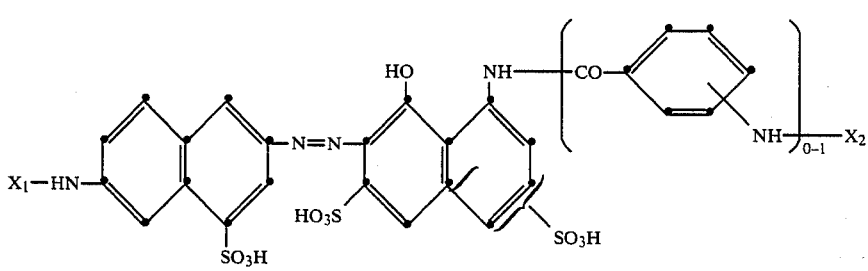 (17)
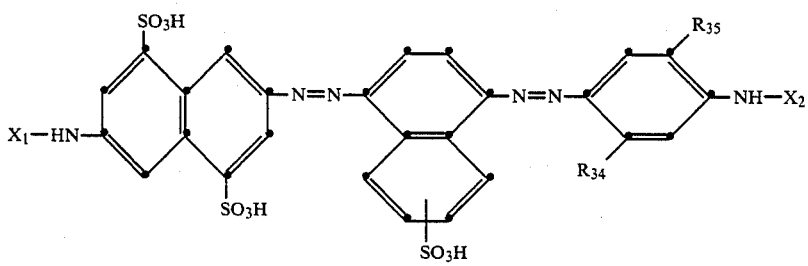 (18)

-continued
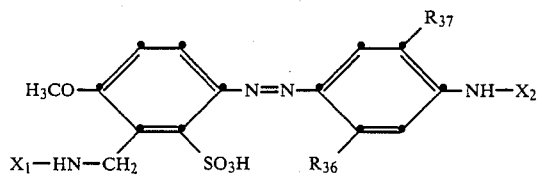 (19)
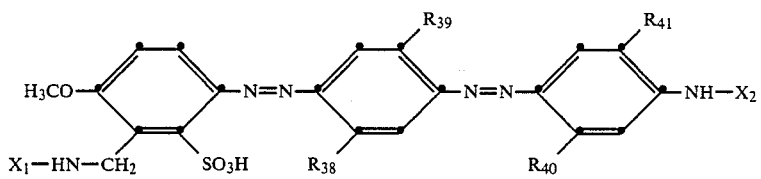 (20)
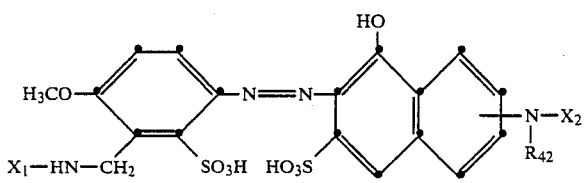 (21)
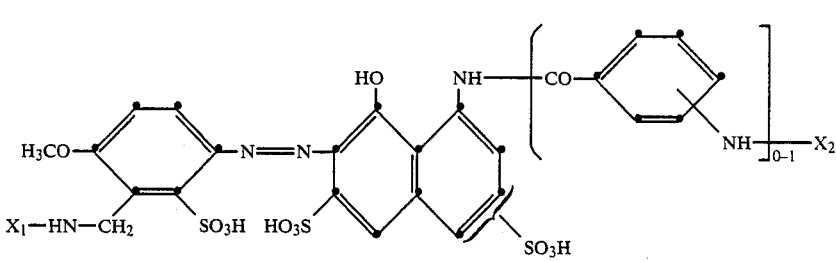 (22)
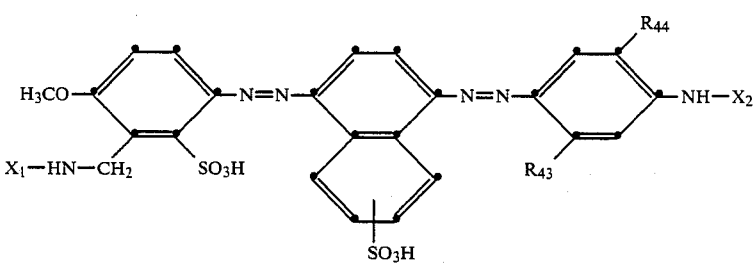 (23)
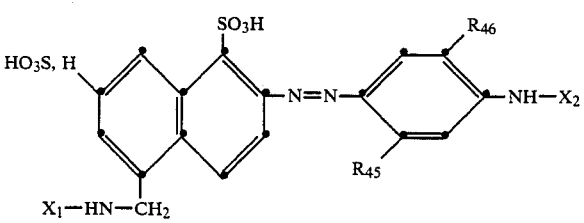 (24)
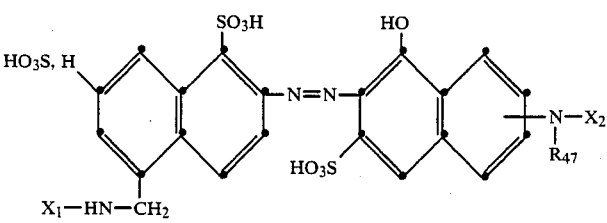 (25)

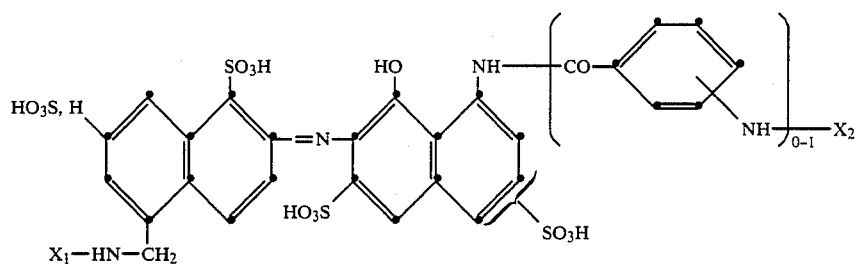
(26)
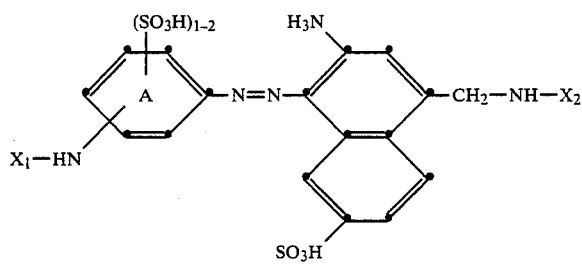
(27)
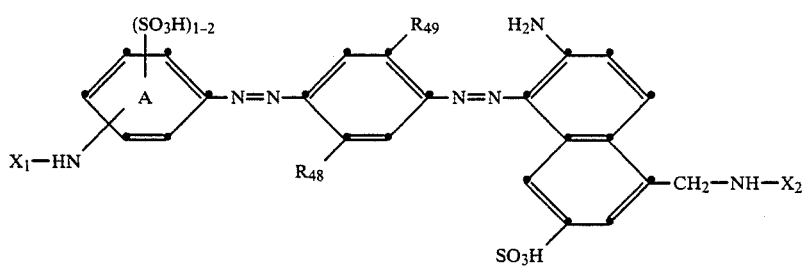
(28)
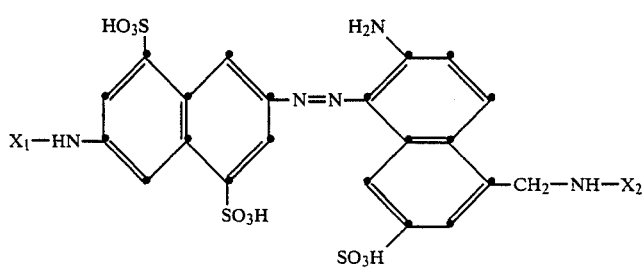
(29)
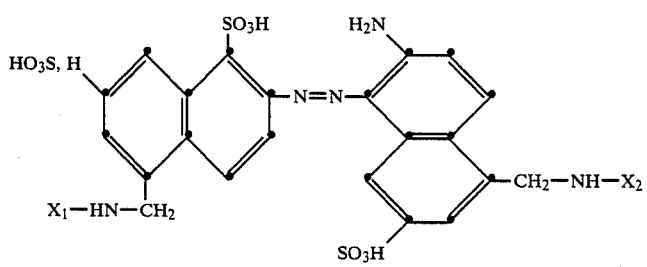
(30)
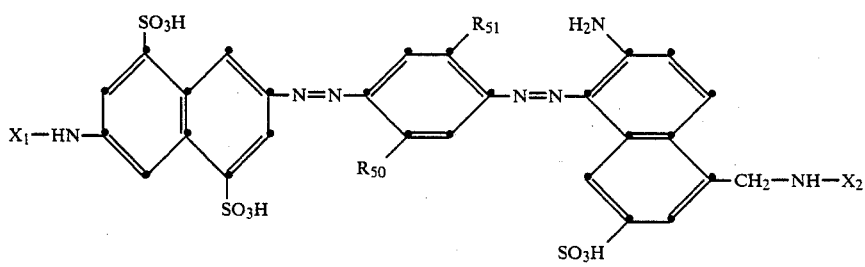
(31)

-continued
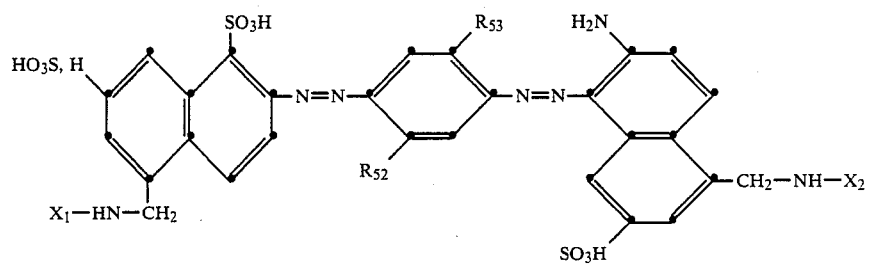
(32)
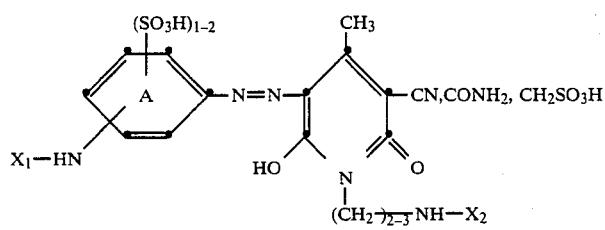
(33)
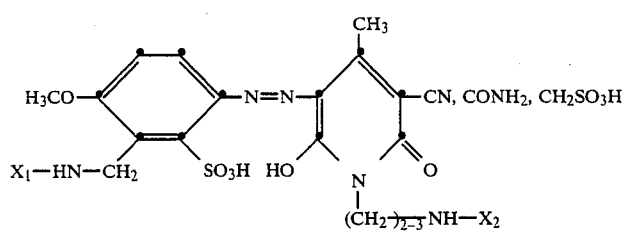
(34)
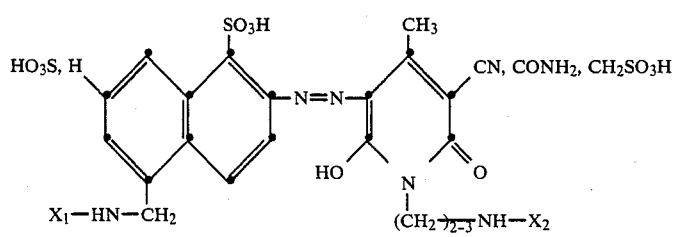
(35)
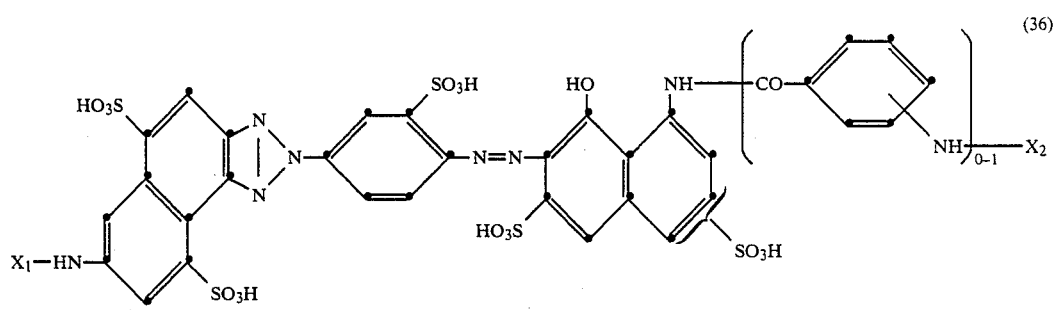
(36)
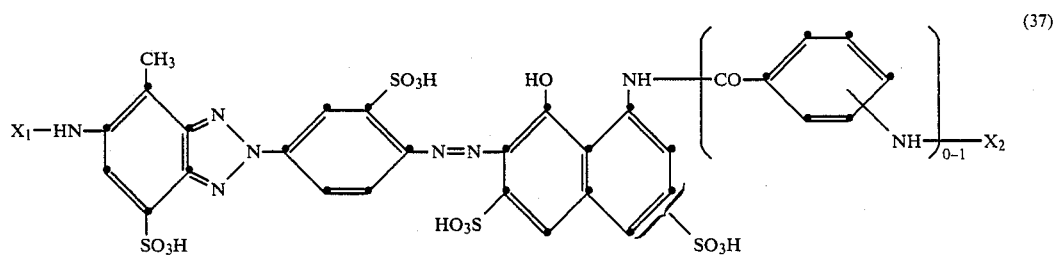
(37)

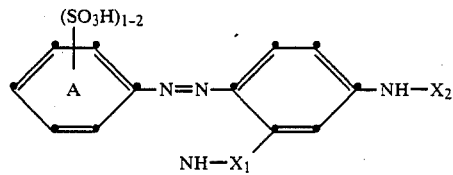
(38)

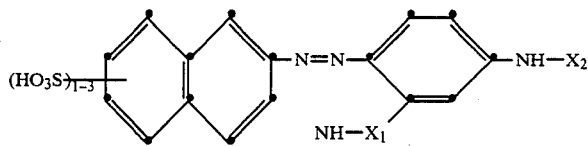
(39)

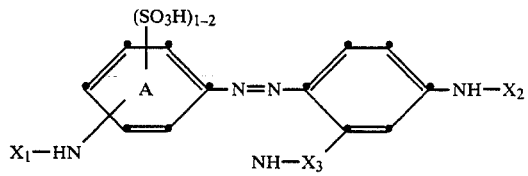
(40)

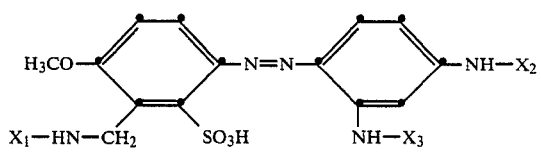
(41)

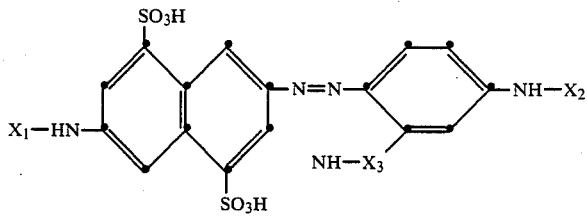
(42)

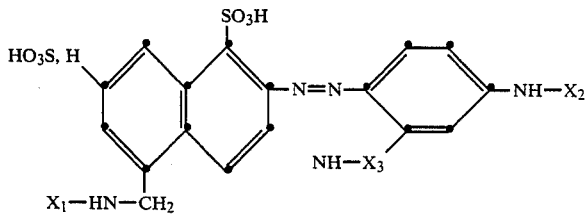
(43)

In the formulae (5) to (43), the radicals $R_{22}$, $R_{33}$, $R_{42}$ and $R_{47}$ are each hydrogen or $C_{1-4}$-alkyl; the other radicals $R_6$ to $R_{21}$, $R_{23}$ to $R_{32}$, $R_{34}$ to $R_{41}$, $R_{43}$ to $R_{46}$ and $R_{48}$ to $R_{53}$ are each hydrogen, $C_{1}$-$C_{4}$-alkyl, $C_{1}$-$C_{4}$-alkoxy, $C_{1}$-$C_{4}$-alkanoylamino, ureido or halogen, and the radicals $R_6$, $R_7$, ... etc. which belong to one and the same formula are independent of one another; $X_1$ and $X_2$ and if present $X_3$ are as defined under the formula (2); and the A benzene rings can be further substituted. Preferably the radicals $R_{22}$, $R_{33}$, $R_{42}$ and $R_{47}$ are each hydrogen, methyl or ethyl, and the other abovementioned radicals $R_6$ to $R_{21}$, ... and so on are each hydrogen, methyl, ethyl, methoxy, ethoxy, acetylamino, ureido or chlorine. In the reactive dyes of the formulae (5), (6), (10) to (12), (27), (28), (33), (38) and (40) the A benzene rings are preferably not further substituted.

In the preferred reactive dyes of the formulae (3) and (4) the A benzene rings are preferably likewise not further substituted; the diazo components are in this case especially 1,3-phenylene-4-sulfonic acid, 1,4-phenylenediamine-2-sulfonic acid, 1,4-phenylenediamine-2,5-disulfonic acid or 1,3-phenylenediamine-4,6-disulfonic acid. The radical $R_5$ in the formula (3) is in particular hydrogen, methyl or ethyl.

Particular preference goes to reactive dyes of the formulae (1) and (3) to (43) in which $X_1$ and $X_2$ and if present $X_3$, independently of one another, are each a radical of the formula (2) in which the amino group $-NR_3R_4$ is $-NH_2$, N-β-hydroxyethylamino, N,N-di-β-hydroxyethylamino, β-sulfoethylamino, phenylamino which is unsubstituted or substituted in the phenyl nucleus by chlorine, methyl, ethyl, methoxy, ethoxy, acetylamino, hydroxyl, carboxyl, sulfomethyl or sulfo, N-$C_{1-4}$-alkyl-N-phenylamino which is unsubstituted or substituted in the phenyl nucleus by chlorine, methyl or ethyl, N-sulfo-$C_{1-4}$-alkyl-N-phenylamino which is unsubstituted or substituted in the phenyl nucleus by chlorine, methyl or ethyl, N-hydroxy-$C_{1-4}$-alkyl-N-phenylamino or sulfonaphthylamino.

Consideration must also go to reactive dyes of the formula (1) in which one of the two radicals —N(R-

$_1$)—X$_1$ and —N(R$_2$)—X$_2$ or both is or are bonded to the chromophore via a radical of the formula

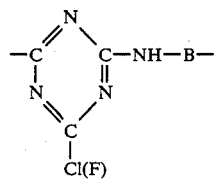

In this case the radical —N(R$_1$)—X$_1$ and/or —N(R$_2$)—X$_2$ is bonded to B; B is an unsubstituted or substituted aliphatic or aromatic bridge member. Bridge member B is preferably an alkylene or arylene radical. For instance, B can be a straight-chain or branched alkylene radical which is long (for example has 10 or more carbon atoms) or shorter; consideration must in particular go to an alkylene radical having 2 to 6 carbon atoms, for example ethylene, propylene, butylene, hexylene or cyclohexylene. An arylene radical B is for example a naphthylene radical, a radical of a diphenyl or stilbene, or in particular a phenylene radical. The radical B can contain further substituents, for example halogen atoms, such as fluorine, chlorine and bromine, alkyl groups having 1 to 4 carbon atoms, such as methyl, ethyl and propyl, alkoxy groups having 1 to 4 carbon atoms, such as methoxy, ethoxy, propyloxy and isopropyloxy, carboxyl or sulfo.

The process for preparing reactive dyes of the formula (1) comprises reacting diazo components of the formula

D—NH$_2$ (45)

or their precursors, coupling components of the formula

H—K (46)

2 equivalents of 2,4,6-trifluoro-s-triazine and 2 equivalents of identical or different amines by diazotisation, coupling and condensation in suitable order to reactive dyes of the formula (1).

The diazo components of the formula (45) and the coupling components of the formula (46) together must contain, in the radicals D and K, two amino groups, vis. —N(R$_1$)H and —N(R$_2$)H, and can also, if desired, contain further acylatable amino groups. If desired use is made of appropriate acetylamino or nitro compounds in which the acetylamino or nitro group has been converted into the NH$_2$ group, by hydrolysis or reduction respectively, before the condensation with the fluorotriazine.

Since the individual process steps given above can be carried out in various orders, in some cases even simultaneously if desired, there are various possible process variants. The starting materials to be used in every partial reaction can be gleaned from the formula (1). In general, the reaction is carried out in successive steps in which the order of the simple reactions between the individual reaction components advantageously depends on the special conditions. Since in certain circumstances one of the two fluorotriazine radicals is hydrolysed, any intermediate which contains acetylamino groups (see hereinafter) must be hydrolysed to split off the acetyl groups before it is condensed with an aminodifluorotriazine or trifluorotriazine.

In important variants of the process, 1. an aminoacetylaminobenzenesulfonic acid is diazotised and coupled onto a coupling component which contains an acetylamino group, the resulting azo dye is hydrolysed, the resulting diaminoazo dye is condensed with 2 equivalents of 2,4,6-trifluoro-s-triazine and finally reacted with 2 equivalents of an amine HNR$_3$R$_4$, or is condensed with 2 equivalents of an aminodifluorotriazine. Instead of using an aminoacetylaminobenzenesulfonic acid and a coupling component which contains an acetylamino group it is also possible to use an aminonitrobenzenesulfonic acid and a coupling component which contains a nitro group, to convert the nitro groups in the resulting dinitroazo dye into amino groups by reduction, for example with iron using the BéCHAMPS method, and to process the resulting diaminoazo dyes further as described above;

2. a coupling component which contains an acylatable amino group is condensed with an aminodifluorotriazine, also 2,4,6-trifluoro-s-triazine is condensed with a diazo component, for example a diaminobenzenesulfonic acid, and an amine, the secondary condensation product is diazotised and coupled onto the intially prepared condensation product of the coupling component;

3. a coupling component which has an acylatable amino group is condensed with 2,4,6-trifluoro-s-triazine, the resulting primary condensation product is condensed with an amine, and the secondary condensation product is coupled with the diazotised secondary condensation product of 2,4,6-trifluoro-s-triazine, a diazo component and a further amine;

4. 2,4,6-trifluoro-s-triazine is condensed with an amine and then with a diaminobenzenesulfonic acid, the secondary condensation product is diazotised and coupled onto a coupling component which contains a diazotisable amino group, the resulting monoazo compound is diazotised and coupled onto a further coupling component which contains an acylatable amino group, the free acylatable amino group in the radical of the second coupling component is then condensed with 2,4,6-trifluoro-s-triazine and is finally condensed with 1 equivalent of an amine or with 1 equivalent of an aminodifluoro-s-triazine. The two amines which are used in succession can be identical or different. The initially prepared secondary condensation product can also be obtained in reverse order: condensation of 2,4,6-trifluoro-s-triazine with a diaminobenzenesulfonic acid, followed by condensation with an amine; and 5. a diazo component, for example a diaminobenzenesulfonic acid, is diazotised and coupled onto a coupling component which contains an acylatable amino group, the amino group on the radical of the coupling component is selectively acylated with the primary condensation product of 2,4,6-trifluoro-s-triazine and an amine, the resulting monoazo compound is diazotised and coupled onto a further coupling component which contains an acylatable amino group, and the resulting diazo compound is finally condensed with the primary condensation product of 2,4,6-trifluoro-s-triazine and an amine.

Which reaction is advantageously carried out first in the preparation of a secondary condensation product of amine HNR$_3$R$_4$, 2,4,6-trifluoro-1,3,5-triazine and diaminobenzenesulfonic acid, that of the trifluorotriazine with the amine or that with the diaminobenzenesulfonic acid, differs from case to case and chiefly depends on the solubility of the amino compounds involved and the basicity of the amino groups to be acylated.

In the above explanation of the most important variants of the process, diaminobenzenesulfonic acid and aminoacetylaminobenzenesulfonic acid were mentioned more than once as diazo components. Instead of these it is of course also possible to use, in accordance with the definition of the radical D in the formula (1), other components, for example differently substituted diaminobenzenes, such as 1,4-diaminobenzene or 1,3-diamino-4-chlorobenzene, or diaminonaphthalenes, such as 2,6-diaminonaphthalene and the like.

There now follows specific examples of possible starting materials which can be used for preparing reactive dyes of the formula (1).

DIAZO COMPONENTS 1,3-Diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-daimino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenyline), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5sulfonic acid, 1,5-diamino-6-methylbenzene-3-sulfonic acid, 1,3-diamino-6-methylbenzene-4-sulfonic acid, 3-(3'- or 4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diaminobenzene-2-methylbenzene, 4,4'-diaminodiphenyl oxide, 4,4'-diaminodiphenylurea-2,2'-disulfonic acid, 4,4'-diaminodiphenyloxyethane-2,2'-disulfonic acid, 4,4'-diaminostilbene-2,2'-disulfonic acid, 4,4'-diaminodiphenylethane-2,2'-disulfonic acid, 2-amino-5-aminomethylnaphthalene-1-sulfonic acid, 2-amino-5-aminomethylnaphthalene-1,7-disulfonic acid and 1-amino-4-methoxy-5-aminomethylbenzene-6-sulfonic acid.

If the diazo component to be used is not to be a diamine but an aminoacetylamino compound from which the acetyl group is subsequently to be split off by hydrolysis, as described above in the explanations of the variants of the process, the monoacetyl compounds of the abovementioned diazo components are suitable for this purpose, examples being 1-acetylamino-3-aminobenzene-4-sulfonic acid or 1-acetylamino-4-aminobenzene-3-sulfonic acid.

If the two radicals $-N(R_1)-X_1$ and $-N(R_2)-X_2$ in the formula (1) are bonded to the same component, for example the coupling component, as described above, it is also possible to use diazo components which, in addition to the amino group to be diazotised, contain no acylatable amino group, examples being aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 1-aminobiphenyl, 1-aminobenzene-2-, -3- or -4-carboxylic acid, 2-aminodiphenyl ether, 1-aminobenzene-2-, -3- or -4-sulfonamide, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6methylbenzene-3- or -4-sulfonic acid, 1-aminonaphthalene, 2-aminonaphthalene, 1-aminonaphthalene-2-, -4-, -5-, -6-, -7- or -8-sulfonic acid, 2-aminoaphthalene-1-, -3-, -4-, -5-,-6-, -7- or -8-sulfonic acid, 2-aminonaphthalene-3,6- or -5,7-disulfonic acid, 1-aminonaphthalene-3,6- or -5,7-disulfonic acid, 2-aminonapthalene-1,5-, -1,7-, -3,6-, -5,7-, -4,8- or -6,8-disulfonic acids, 1-aminonaphthalene-2,5,7-trisulfonic acid, 2-aminonaphthalene-1,5,7-, -3,6,8- or -4,6,8,-trisulfonic acid, 4-aminoazobenzene-3,4'-disulfonic acid, 3-methoxy-4-amino-6-methylazobenzene-2',4'-disulfonic acid or 3-methoxy-4-amino-6-methylazobenzene-2',5'-disulfonic acid.

COUPLING COMPONENTS

1-Amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or 2-ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- or -4,6-disulfonic acid, 1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6- or -4,6-disulfonic acid, 2-(4'-amino-3'-sulfophenylamino)-5-hydroxynaphthalene-7-sulfonic acid, 1-amino-8-hydroxynaphthalene-4-sulfonic acid, 2,4,6-triamino-3-cyanopyridine, 1-β-aminoethyl-3-cyano-4-methyl-6-hydroxypyrid-2-one, 1-γ-aminopropyl-3-sulfomethyl-4-methyl-6-hydroxyprid-2-one and 1,3-diaminobenzene.

REACTIVE COMPONENTS 2,4,6-Trifluoro-1,3,5-triazine (cyanuric fluoride) and the primary condensation products of 2,4,6-trifluoro-1,3,5-triazine with the amines mentioned hereinafter.

AMINES

Ammonia, methylamine, dimethylamine, ethylamine, diethylamine, propylamine, isopropylamine, butylamine, dibutylamine, isobutylamine, sec.-butylamine, tert.-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, β-sulfatoethylamine, benzylamine, phenethylamine, cyclohexylamine, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, 3- and 4-acetylaminoaniline, 2,5-dimethoxyaniline, o-, m- and p-anisidine, o-, m- and p-phenetidine, 2-methoxy-5-methylaniline, 2-ethoxy-5-methoxyaniline, 4-bromoaniline, 3-aminobenzamide, 4-aminophenylsulfamide, 3-trifluoromethylaniline, 3- and 4-aminophenylurea, 1-naphthylamine, 2-naphthylamine, orthanilic acid, metanilic acid, sulfanilic acid, aniline-2,4-disulfonic acid, aniline-2,5-disulfonic acid, aniline-3,5-disulfonic acid, anthranilic acid, m- and p-aminobenzoic acid, 4-aminophenylmethanesulfonic acid, aniline-N-methanesulfonic acid, 2-aminotoluene-4-sulfonic acid, 2-aminotoluene-5-sulfonic acid, p-aminosalicylic acid, 1-amino-4-carboxybenzene-3-sulfonic acid, 1-amino-2-carboxybenzene-5-sulfonic acid, 1-amino-5-carboxybenzene-2-sulfonic acid, 1-naphthylamine-2-, -3-, -4-, -5-, -6-, -7- and -8-sulfonic acid, 2-naphthylamine-1-, -3-, -4-, -5-, -6-, -7- and -8-sulfonic acid, 1-naphthylamine-2,4-, -2,5-, -2,7-, -2,8-, -3,5-, -3,6-, -3,7-, -3,8-, -4,6-, -4,7-, -4,8- and -5,8-disulfonic acid, 2-naphthylamine-1,5-, -1,6-, -1,7-, -3,6-, -3,7-, -4,7-, -4,8-, -5,7- and -6,8-disulfonic acid, 1-naphthylamine-2,4,6-, -2,4,7-, -2,5,7-, -3,5,7-, -3,6,8,- and -4,6,8-trisulfonic acid, 2-naphthlamine-1,3,7-, -1,5,7-, -3,5,7,-, -3,6,7-, -3,6,8- and -4,6,8-trisulfonic acid, 2-, 3-and 4-aminopyridine, 2-aminobenzothiazole, 5-, 6- and 8-aminoquinoline, 2-aminopyrimidine, morpholine, piperidine and piperazine.

The diazo components of the formula (45) or the intermediates containing a diazotisable amino group are generally diazotised at low temperatures by action of nitrous acid in aqueous mineral acid solution. The diazotised product is coupled onto the coupling component at weakly acid, netural or weakly alkaline pH.

The condensations of 2,4,6-trifluoro-1,3,5-triazine with the diazo components of the formula (45) and the coupling components of the formula (46) and with the amines or with acylatable monoazo or disazo intermediates preferably take place at low temperatures and at weakly acid, neutral or weakly alkaline pH in aqueous solution or suspension. The hydrogen fluoride set free in the course of the condensation is advantageously continuously neutralised by adding aqueous alkali metal hydroxides, carbonates or bicarbonates. Examples of suitable alkali metal compounds are sodium hydroxide, potassium hydroxide, sodium carbonate and sodium hydrogencarbonate, and also basic lithium compounds, such as lithium carbonate, lithium hydrogencarbonate and lithium hydroxide. If desired, basic lithium compounds are even used in coupling at neutral or alkaline pH.

The disazo dyes of the formula (1) are fibre-reactive since they contain a detachable fluorine atom bonded to each of the two s-triazine rings. Fibre-reactive compounds are to be understood as meaning those which are capable of reacting with the hydroxyl groups of cellulose or with the amino groups of natural or synthetic polyamides to form covalent chemical bonds.

The reactive dyes of the formula (1) are suitable for dyeing and printing a very wide variety of materials, such as silk, leather, wool, nylon fibres and polyurethanes and in particular cellulose-containing fibre materials of any type. These fibre materials can be for example the natural cellulose fibres, such as cotton, linen and hemp, as well as viscose and regenerated cellulose. The reactive dyes of the formula (1) are also suitable for dyeing or printing hydroxyl-containing fibres contained in blend fabrics, for example blends of cotton with polyester fibres or nylon fibres.

The dyes according to the invention can be applied to the fibre material and fixed on the fibre in various ways, in particular in the form of aqueous dye solutions and print pastes. They are suitable not only for the exhaust method but also for dyeing by the pad-dyeing method whereby the goods are impregnated with aqueous dye solutions which can, if desired, also contain salt, and the dyes are fixed, if desired by the action of heat, after an alkali treatment or in the presence of alkali. They are particularly suitable for the so-called cold pad-batch method whereby the dye is applied on the pad-mangle together with the alkali and is then fixed by allowing the dyeing to stand at room temperature for several hours. After the fixing the dyeings or prints are thoroughly rinsed with cold and hot water in the absence or presence of an agent which acts as a dispersant and promotes the diffusion of the unfixed portions.

The reactive dyes of the formula (1) are distinguished by high reactivity and good fixing properties. They can therefore be used for exhaust dyeing at low dyeing temperatures and require only short steaming times when used in the pad-steam process. The degrees of fixation are high, and the unfixed portions are easily washed off.

The reactive dyes of the formula (1) are particularly suitable for dyeing cotton by the exhaust dyeing methods, the difference between the degree of exhaustion and the degree of fixation being remarkably small, i.e. the hydrolysis loss being very small. The reactive dyes of the formula (1) are also particularly suitable for printing, especially on cotton, as well as for printing nitrogen-containing fibres, for example wool, silk or wool-containing blend fabrics.

The dyeings and prints on cellulose fibre materials prepared with the dyes according to the invention have high tinctorial strength and a high fibre-dye bond stability, not only in the acid but also in the alkaline range, and also a good light fastness and very good wet fastness properties, such as washing, water, seawater, crossdyeing and perspiration fastness properties, as well as a good pleating fastness, hot-press fastness and rub fastness.

The following examples serve to illustrate the invention. The temperatures are given in degrees centigrade. Parts and percentages are by weight unless otherwise stated. Parts by weight relate to parts by volume as the kilogram relates to the liter.

In the following illustrative embodiments the preparation of the monoazo or disazo intermediate compounds has not been described in all cases, but it follows readily from the general description.

EXAMPLE 1

(a) 43.7 parts of 2-amino-6-(3'-amino-6'-sulfophenylazo)-5-hydroxynaphthalene-7-sulfonic acid of the formula

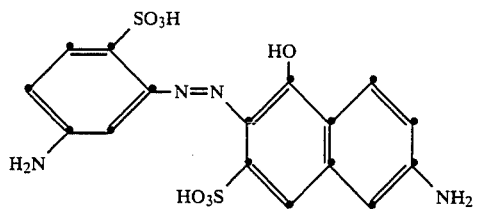

(prepared by coupling diazotised 1-amino-3-acetylaminobenzene-2-sulfonic acid onto 2-acetylamino-5-hydroxynaphthalene-7-sulfonic acid at pH 5 and subsequent alkaline hydrolysis) are dissolved in 1,200 ml of water under neutral conditions, and the solution is cooled down to 10° C. After addition of a neutral mixture of 57.6 parts of 2,4-difluoro-6-(2'-sulfophenylamino)-1,3,5-triazine and 600 ml of water the temperature is raised to 20° to 25° C. in the course of 2 to 3 hours during which the pH of the reaction mixture is held at 7.0 by continuous addition of 2N sodium hydroxide solution. After the reaction has ended the reactive dye which has formed and has the formula

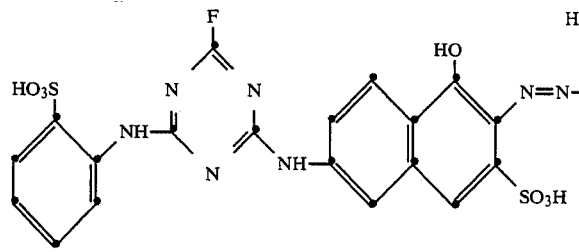

is isolated at pH 7 by evaporating the reaction solution. It dyes cotton in orange shades.

(b) 23.9 parts of 2-amino-5-hydroxynaphthalene-7-sulfonic acid are dissolved in 800 ml of water under neutral conditions, and the solution is cooled down to 10° C. After addition of a mixture of 28.8 parts of 2,4-difluoro-6-(2'-sulfophenylamino)-1,3,5-triazine and 300 ml of water the temperature is raised to 20° to 25° C. while the reaction mixture is held at pH 5-6 by the continuous addition of 2N sodium hydroxide solution. After the reaction has ended a mixture of 45.6 parts of diazotised 2-(3'-amino-4'-sulfophenylamino)-4-fluoro-6-(2''-sulfophenylamino)-1,3,5-triazine with 300 parts of water is added at 0° to 5° C. After the coupling reaction at pH 6-7 has ended the same reactive dye as mentioned in Example 1a is isolated by salting out. It dyes cotton in orange shades.

EXAMPLE 2

(a) 43.7 parts of 2-amino-6-(4'-sulfophenylazo)-5-hydroxynaphthalene-7-sulfonic acid of the formula

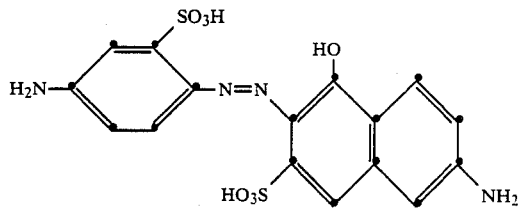

(prepared by coupling diazotised 1-amino-4-acetylaminobenzene-2-sulfonic acid onto 2-acetylamino-5-hydroxynaphthalene-7-sulfonic acid at pH 5 and subsequent alkaline hydrolysis) are dissolved in 1,200 ml of water under neutral conditions, and the solution is cooled down to 10° C.

After addition of a neutral mixture of 57.6 parts of 2,4-difluoro-6-(2'-sulfophenylamino)-1,3,5-triazine and 600 ml of water the temperature is raised to 20° to 25° C. in the course of 2 to 3 hours during which the pH of the reaction mixture is held at 7.0 by continuous addition of 2N sodium hydroxide solution. After the reaction has ended the reactive dye which has formed and has the formula

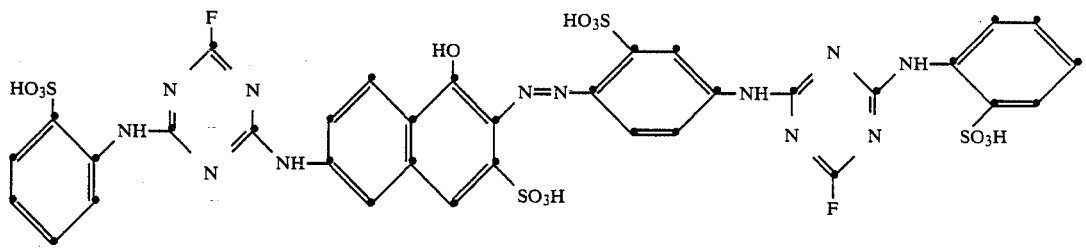

is isolated at pH 7 by evaporating the reaction solution. It dyes cotton in yellowish red shades.

(b) 23.9 parts of 2-amino-5-hydroxynaphthalene-7-sulfonic acid are dissolved in 800 ml of water under neutral conditions, and the solution is cooled down to 10° C. After addition of a mixture of 28.8 parts of 2,4-difluoro-6-(2'-sulfophenylamino)-1,3,5-triazine and 300 ml of water the temperature is raised to 20° to 25° C. while the reaction mixture is held at pH 5-6 by the continuous addition of 2N sodium hydroxide solution. After the reaction has ended a mixture of 45.6 parts of diazotised 2-(4'-amino-3'-sulfophenylamino)-4-fluoro-6-(2''-sulfophenylamino)-1,3,5-triazine with 300 parts of water is added at 0° to 5° C. After the coupling reaction at pH 6-7 has ended the same reactive dye as mentioned in Example 2a is isolated by salting out. It dyes cotton in yellowish red shades.

EXAMPLE 3

23.9 parts of 2-amino-5-hydroxynaphthalene-7-sulfonic acid are dissolved in 800 ml of water under neutral conditions, and the solution is cooled down to 10° C. After addition of a mixture of 28.8 parts of 2,4-difluoro-6-(2'-sulfophenylamino)-1,3,5-triazine and 300 ml of water the temperature is raised to 20° to 25° C. while the reaction mixture is held at pH 5-6 by the continuous addition of 2N sodium hydroxide solution. After the reaction has ended a mixture of 45.6 parts of diazotised 2-(4'-amino-2',5'-disulfophenylamino)-4-fluoro-6-(N-ethyl-N-phenylamino)-1,3,5-triazine with 300 parts of water is added at 0° to 5° C. After the coupling reaction at pH 6 to 7 has ended the reactive dye of the formula

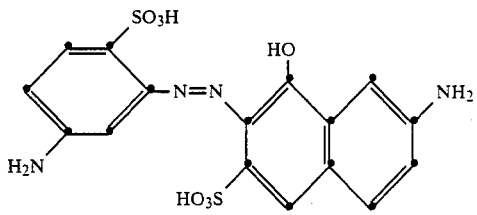

(prepared by coupling diazotised 1-amino-3-acetylaminobenzene-2-sulfonic acid onto 2-acetylamino-8-hydroxynaphthalene-6-sulfonic acid at pH 5 and subsequent alkaline hydrolysis) are dissolved in 1,200 ml of water under neutral conditions, and the solution is cooled down to 10° C.

After addition of a neutral mixture of 57.6 parts of 2,4-difluoro-6-(2'-sulfophenylamino)-1,3,5-triazine and 600 ml of water the temperature is raised to 20° to 25° C. in the course of 2 to 3 hours during which the pH of the reaction mixture is held at 7.0 by continuous addition of 2N sodium hydroxide solution. After the reaction has ended the reactive dye which has formed and has the formula

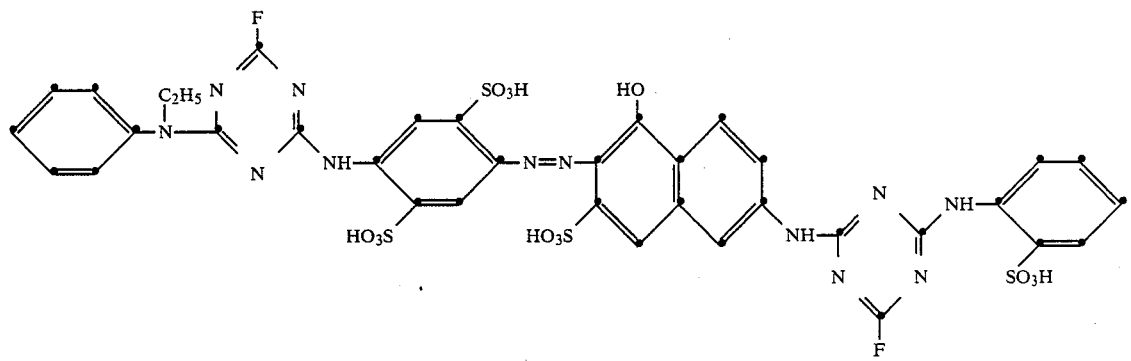

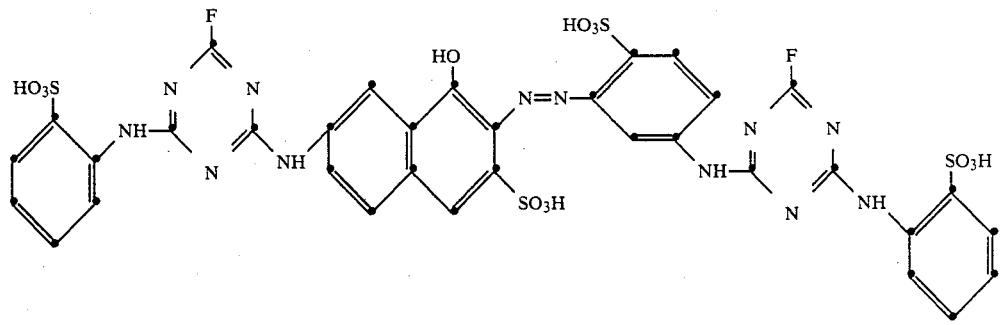

is isolated at pH 7 by evaporating the reaction solution. It dyes cotton in red shades.

EXAMPLE 4

(a) 43.7 parts of 2-amino-7-(3'-amino-6'-sulfophenylazo)-8-hydroxynaphthalene-6-sulfonic acid of the formula is isolated at pH 7 by evaporating the reaction solution. It dyes cotton in scarlet shades.

(b) 23.9 parts of 2-amino-8-hydroxynaphthalene-6-sulfonic acid are dissolved in 800 ml of water under neutral conditions, and the solution is cooled down to 10° C. After addition of a mixture of 28.8 parts of 2,4-difluoro-6-(2'-sulfophenylamino)-1,3,5-triazine and 300 ml of water the temperature is raised to 20° to 25° C. while the reaction mixture is held at pH 5 to 6 by the continuous addition of 2N sodium hydroxide solution. After the reaction has ended a mixture of 45.6 parts of diazotised 2-(3'-amino-4'-sulfophenylamino)-4-fluoro-6-

(2''-sulfophenylamino)-1,3,5-triazine with 300 parts of water is added at 0° to 5° C. After the coupling reaction at pH 6 to 7 has ended the same reactive dye as mentioned in Example 4a is isolated by salting out. It dyes cotton in scarlet shades.

EXAMPLE 5

43.7 parts of 2-amino-7-(3'-amino-6'-sulfophenylazo)-8-hydroxynaphthalene-6-sulfonic acid of the formula

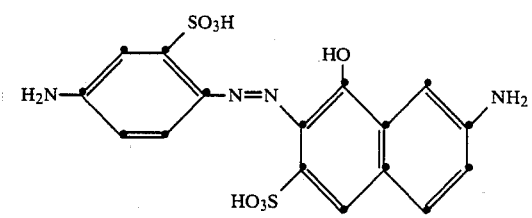

(prepared by coupling diazotised 1-amino-4-acetylaminobenzene-2-sulfonic acid onto 2-acetylamino-8-hydroxynaphthalene-6-sulfonic acid at pH 5 and subsequent alkaline hydrolysis) are dissolved in 1,400 ml of water under neutral conditions, and the solution is cooled down to 0° C. At this temperature 28 parts of 2,4,6-trifluoro-1,3,5-triazine are added dropwise in the course of 20 minutes during which the reaction solution is held at pH 6 to 7 by the simultaneous addition of 2N sodium hydroxide solution. After the reaction has ended a neutral solution of 34.6 parts of 1-aminobenzene-3-sulfonic acid in 300 ml of water is added while the reaction solution is held at pH 6 to 7 by the simultaneous addition of 2N sodium hydroxide solution and the temperature is raised to 20° to 25° C. in the course of 2 to 3 hours. After the reaction has ended the reactive dye which has formed and has the formula

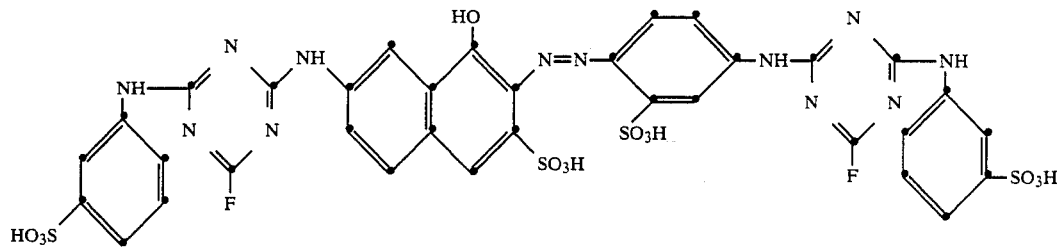

is isolated at pH 7 by evaporating the reaction solution. It dyes cotton in ruby shades.

The methods described in Examples 1 to 5 can be used to prepare further useful reactive dyes of the formula

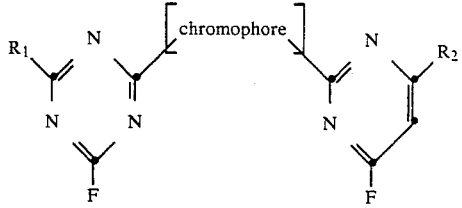

in which $R_1$, $R_2$ and chromophore are as defined in Table I below.

TABLE I
| Examples | R₁ | R₂ | Chromophore | Hue on cotton |
|---|---|---|---|---|
| 6 |  | 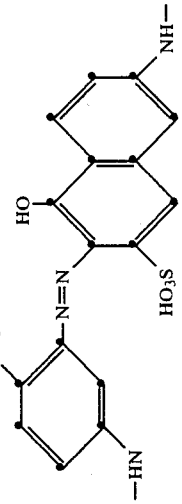 | 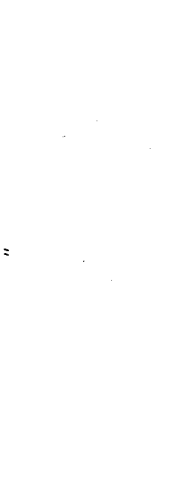 | orange |
| 7 |  | 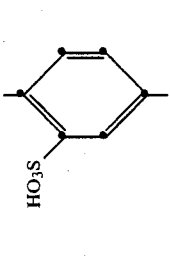 | " | " |
| 8 | 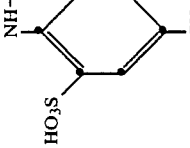 |  | " | " |
| 9 | 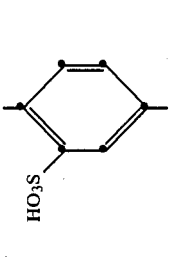 | 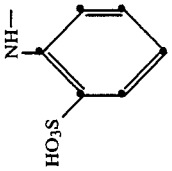 | " | " |

TABLE I-continued
| Examples | R₁ | R₂ | Chromophore | Hue on cotton |
|---|---|---|---|---|
| 10 | 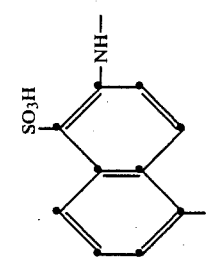 | 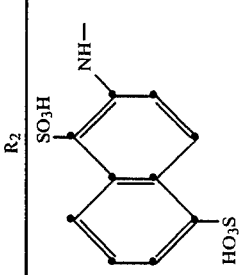 | " | " |
| 11 | 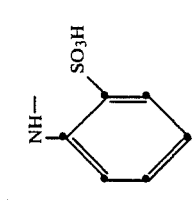 | 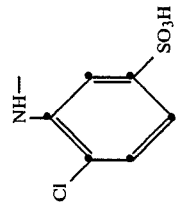 | " | " |
| 12 | 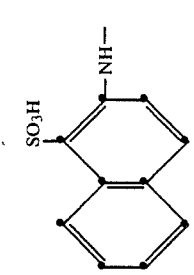 | 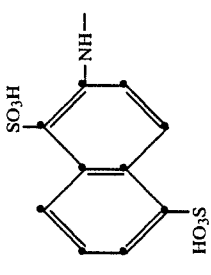 | " | " |
| 13 | 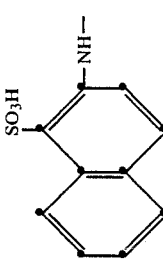 | 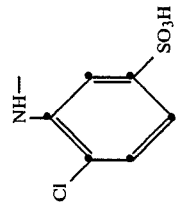 | " | " |

TABLE I-continued

| Examples | R₁ | R₂ | Chromophore | Hue on cotton |
|---|---|---|---|---|
| 14 | 2-aminobenzenesulfonic acid (NH-, SO₃H on benzene) | 4-amino-benzene-1,3-disulfonic acid (NH-, HO₃S, SO₃H on benzene) | " | " |
| 15 | 2-aminobenzenesulfonic acid | 2-amino-naphthalene-1-sulfonic acid (NH-, SO₃H on naphthalene) | " | " |
| 16 | 2-aminobenzenesulfonic acid | 2-amino-naphthalene-1,5-disulfonic acid (NH-, SO₃H, HO₃S on naphthalene) | " | " |
| 17 | 2-aminobenzenesulfonic acid | 4-aminobenzene-1,3-disulfonic acid (NH-, SO₃H, HO₃S on benzene) | " | " |

TABLE I-continued

| Examples | $R_1$ | $R_2$ | Chromophore | Hue on cotton |
|---|---|---|---|---|
| 18 | 2-amino-5-sulfo-toluene (NH, SO₃H, CH₃) | aniline-2,4-disulfonic acid with NH (HO₃S, NH—, SO₃H) | " | " |
| 19 | 2-amino-5-sulfo-toluene | 4-amino-2-sulfo-aniline (HO₃S, NH—, SO₃H) | " | " |
| 20 | 2-amino-5-sulfo-toluene | 8-amino-naphthalene-sulfonic acid (SO₃H, NH—, HO₃S) | " | " |
| 21 | amino-naphthalene-sulfonic acid (SO₃H, NH—, HO₃S) | 2-amino-5-methyl-sulfo-benzene (NH—, SO₃H, CH₃) | " | " |

TABLE I-continued
| Examples | R₁ | R₂ | Chromophore | Hue on cotton |
|---|---|---|---|---|
| 22 | 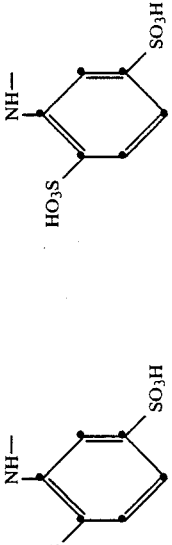 | 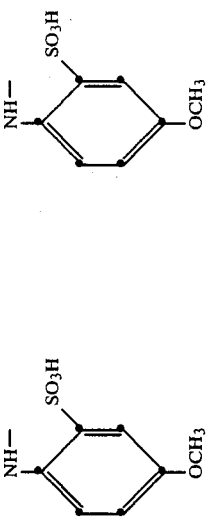 | " | " |
| 23 | 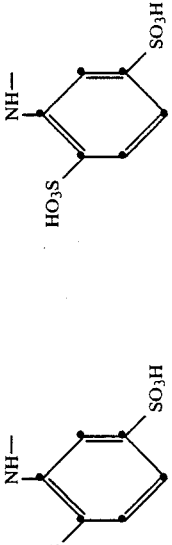 | 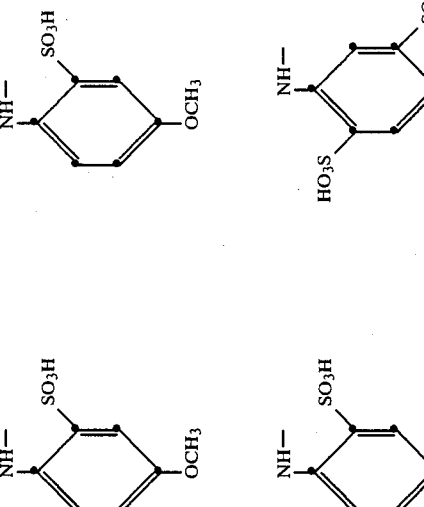 | " | " |
| 24 |  | 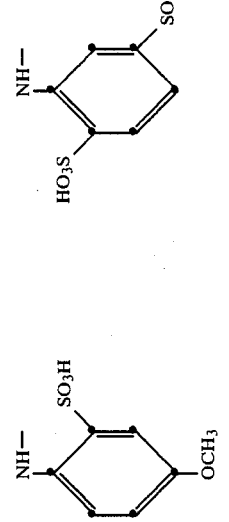 | " | " |
| 25 |  | 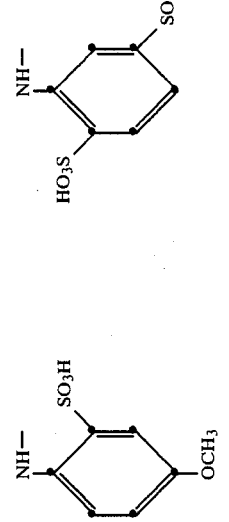 | " | " |

TABLE I-continued
| Examples | R₁ | R₂ | Chromophore | Hue on cotton |
|---|---|---|---|---|
| 26 | 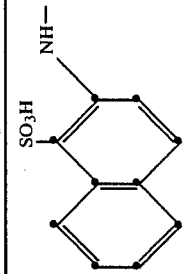 | 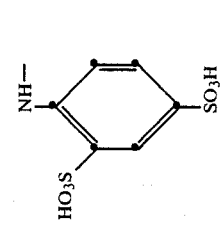 | " | " |
| 27 | 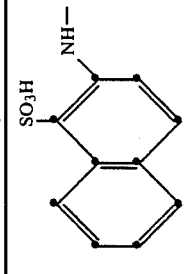 | 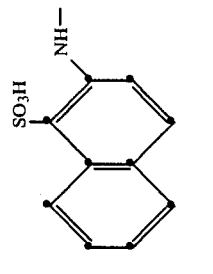 | " | " |
| 28 | 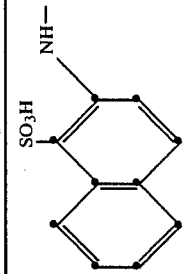 | 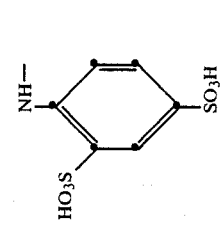 | " | " |
| 29 | 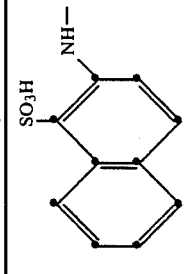 | 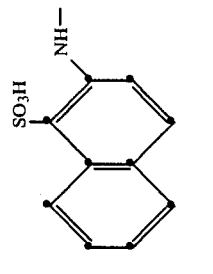 | " | " |

TABLE I-continued
| Examples | R₁ | R₂ | Chromophore | Hue on cotton |
|---|---|---|---|---|
| 30 | 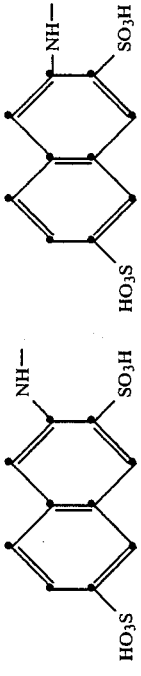 | 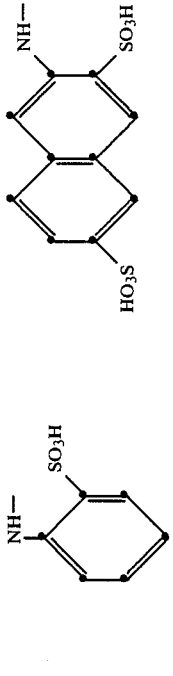 | ″ | ″ |
| 31 | 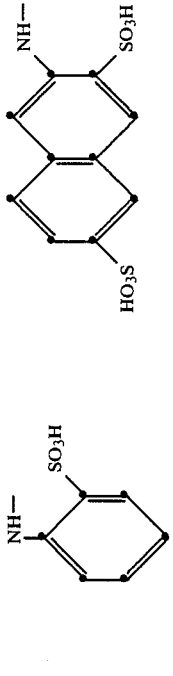 | 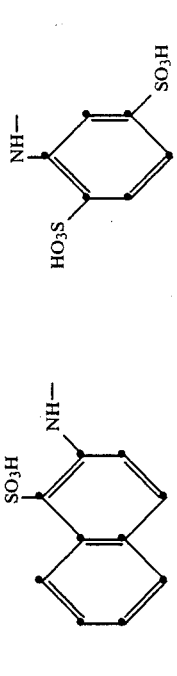 | ″ | ″ |
| 32 | 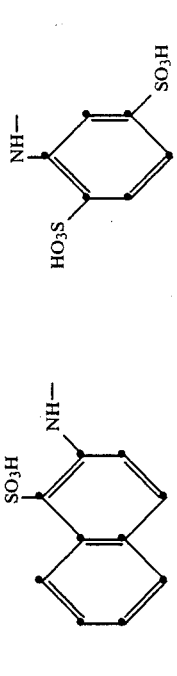 | 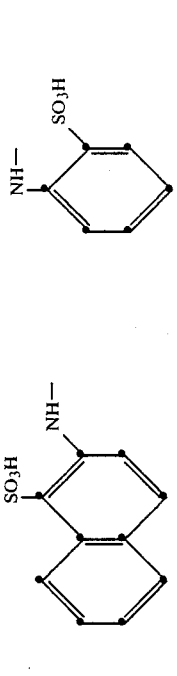 | ″ | ″ |
| 33 | 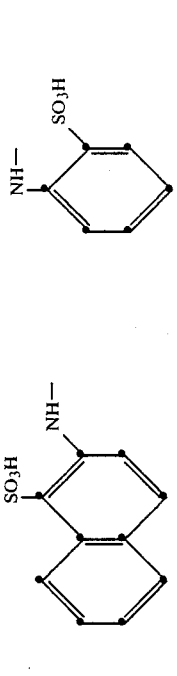 | 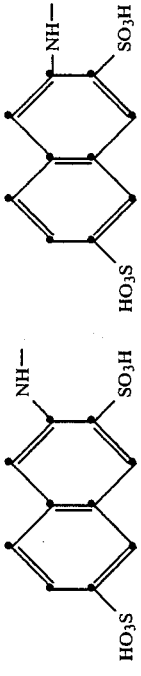 | ″ | ″ |

TABLE I-continued

| Examples | $R_1$ | $R_2$ | Chromophore | Hue on cotton |
|---|---|---|---|---|
| 34 | NH—C₆H₃(SO₃H) (2-SO₃H) | NH—C₆H₃(SO₃H) (3-SO₃H) | " | " |
| 35 | NH—C₆H₄—SO₃H (para) | NH—C₆H₄—SO₃H (para) | " | " |
| 36 | —N(C₂H₅)—C₆H₅ | —N(C₂H₅)—C₆H₅ | " | " |
| 37 | morpholino | morpholino | " | " |
| 38 | —NHCH₂CH₂OH | —NHCH₂CH₂OH | " | " |
| 39 | —NHCH₂CH₂SO₃H | —NHCH₂CH₂SO₃H | " | " |

TABLE I-continued

| Examples | R₁ | R₂ | Chromophore | Hue on cotton |
|---|---|---|---|---|
| 40 | -NH-C₆H₃(CH₃)- (2-methylphenylamino) | -NH-C₆H₃(CH₃)- (2-methylphenylamino) | " | " |
| 41 | 8-amino-naphthalene-1-sulfonic acid | 8-amino-naphthalene-1-sulfonic acid | " | " |
| 42 | 8-amino-naphthalene-6-sulfonic acid | 8-amino-naphthalene-6-sulfonic acid | " | " |
| 43 | 8-amino-naphthalene-6-sulfonic acid | 8-amino-naphthalene-7-sulfonic acid | " | " |

TABLE I-continued

| Examples | R₁ | R₂ | Chromophore | Hue on cotton |
|---|---|---|---|---|
| 44 | naphthalene with NH—, SO₃H, HO₃S | naphthalene with NH—, SO₃H, HO₃S | " | " |
| 45 | naphthalene with NH—, SO₃H, HO₃S | naphthalene with NH—, SO₃H, HO₃S | " | " |
| 46 | benzene with NH—, SO₃H, CH₃ | benzene with NH—, SO₃H, CH₃ | azo compound with SO₃H, N=N, HO, HO₃S, NH— groups | yellowish red |
| 47 | naphthalene with SO₃H, NH— | naphthalene with SO₃H, NH— | " | " |

TABLE I-continued
| Examples | R₁ | R₂ | Chromophore | Hue on cotton |
|---|---|---|---|---|
| 48 | 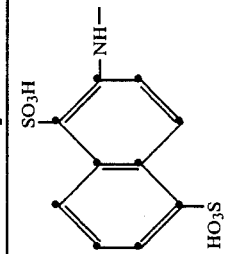 | 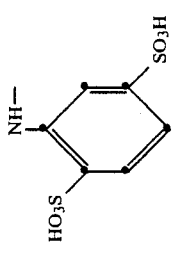 | " | " |
| 49 | 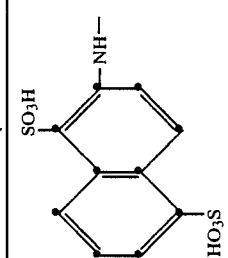 | 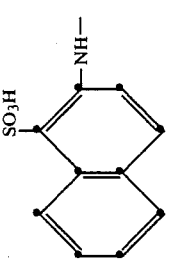 | " | " |
| 50 | 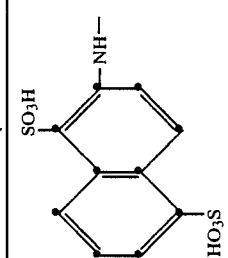 | 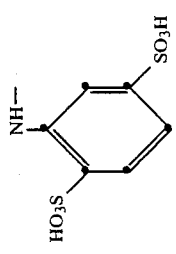 | " | " |
| 51 | 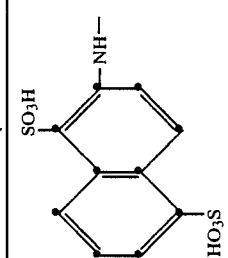 | 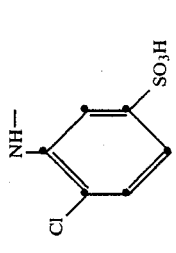 | " | " |

TABLE I-continued
| Examples | R₁ | R₂ | Chromophore | Hue on cotton |
|---|---|---|---|---|
| 52 |  | 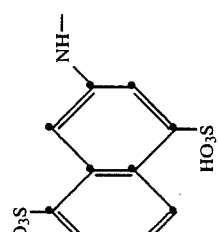 | 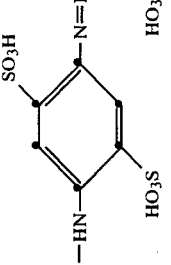 | " |
| 53 |  | 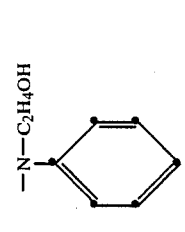 | | " |
| 54 |  |  | | " |
| 55 |  |  | | " |

TABLE I-continued

| Examples | R₁ | R₂ | Chromophore | Hue on cotton |
|---|---|---|---|---|
| 56 | -NH-C₆H₃(SO₃H)₂ | -NH-C₆H₃(SO₃H)(NH-) | | " |
| 57 | -NH-C₆H₄-SO₃H | -NH-naphthyl(SO₃H)(NH-) | [azo chromophore: HO₃S-C₆H₃(SO₃H)-N=N-naphthyl(OH)(SO₃H)(NH-) with NH-C₆H₃(SO₃H)(NH-)] | red |
| 58 | -NH-C₆H₄-SO₃H | -NH-naphthyl(SO₃H)(SO₃H) | | " |
| 59 | -N(CH₃)-C₆H₅ | -NH-C₆H₄-SO₃H | | " |

TABLE I-continued

| Examples | R₁ | R₂ | Chromophore | Hue on cotton |
|---|---|---|---|---|
| 60 | —HN—C₆H₃(CH₃)— (2-methylphenylamino) | —NH—C₆H₃(SO₃H)₂ (2,5-disulfophenylamino with HO₃S at 3-position) | " | " |
| 61 | —NH—C₆H₄—Cl (4-chlorophenylamino) | —NH—C₆H₃(SO₃H)₂ | " | " |
| 62 | —NH—C₆H₅ (phenylamino) | naphthyl-NH₂ with two SO₃H groups | " | " |
| 63 | naphthyl-NH— with HO₃S substituent | —NH—C₆H₄—SO₃H | " | " |

TABLE I-continued
| Examples | $R_1$ | $R_2$ | Chromophore | Hue on cotton |
|---|---|---|---|---|
| 64 | —NHCH$_2$CH$_2$OH | 2-amino-benzenesulfonic acid | " | " |
| 65 | 2-amino-5-methylbenzenesulfonic acid | 2-amino-5-methylbenzenesulfonic acid | 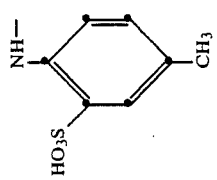 | scarlet |
| 66 | 2-aminobenzenesulfonic acid | 2-amino-5-methylbenzenesulfonic acid | " | " |
| 67 | 3-aminobenzenesulfonic acid | 3-aminobenzenesulfonic acid | " | " |

TABLE I-continued

| Examples | R₁ | R₂ | Chromophore | Hue on cotton |
|---|---|---|---|---|
| 68 | 4-chloro-2-amino-5-sulfophenyl | 1-amino-naphthalene-4,8-disulfonic acid residue | " | " |
| 69 | naphthalene-1,5-disulfonic acid residue | 2-amino-naphthalene-1,5-disulfonic acid residue | " | " |
| 70 | 2-amino-naphthalene-1-sulfonic acid residue | 1,4-diamino-2,5-disulfobenzene residue | " | " |
| 71 | 2-amino-benzenesulfonic acid residue | 2-amino-benzenesulfonic acid residue | " | " |

TABLE I-continued

| Examples | R₁ | R₂ | Chromophore | Hue on cotton |
|---|---|---|---|---|
| 72 | naphthalene with NH–, SO₃H, HO₃S | benzene with NH–, SO₃H | " | " |
| 73 | naphthalene with NH–, HO₃S, HO₃S | naphthalene with NH–, HO₃S, HO₃S | " | " |
| 74 | naphthalene with NH–, HO₃S, HO₃S | naphthalene with NH–, HO₃S, HO₃S | " | " |
| 75 | benzene with NH–, SO₃H, CH₃ | benzene with NH–, SO₃H, CH₃ | azo chromophore with –NH, HO, SO₃H, HO₃S, HN– | ruby |

TABLE I-continued

| Examples | $R_1$ | $R_2$ | Chromophore | Hue on cotton |
|---|---|---|---|---|
| 76 | naphthalene with SO₃H, NH— | naphthalene with SO₃H, NH— | " | " |
| 77 | naphthalene with SO₃H, NH—, HO₃S | naphthalene with SO₃H, NH—, HO₃S | " | " |
| 78 | naphthalene with SO₃H, NH— | benzene with NH—, SO₃H, HO₃S | " | " |
| 79 | benzene with NH—, SO₃H, Cl | benzene with NH—, SO₃H, HO₃S | " | " |

TABLE I-continued

| Examples | R₁ | R₂ | Chromophore | Hue on cotton |
|---|---|---|---|---|
| 80 | NH—C₆H₃(SO₃H)— (2-NH, 1-SO₃H on benzene) | NH—C₆H₃(SO₃H)— (2-NH, 1-SO₃H on benzene) | " | " |
| 81 | 2-NH, 8-HO₃S-naphthyl | 2-NH, 8-HO₃S-naphthyl | " | " |
| 82 | 2-NH, 4-HO₃S, 8-HO₃S-naphthyl | 2-NH, 4-HO₃S, 8-HO₃S-naphthyl | " | " |
| 83 | —N(C₂H₄OH)—C₆H₅ | —N(C₂H₄OH)—C₆H₅ | " | " |

TABLE I-continued

| Examples | R₁ | R₂ | Chromophore | Hue on cotton |
|---|---|---|---|---|
| 84 | aniline-SO₃H (–NH, SO₃H) | aniline-SO₃H (–NH, SO₃H ortho) | bis-azo structure with naphthalene-NH, OH, HO₃S, and phenyl-SO₃H, HO₃S, –NH, N=N linkages | bluish ruby |
| 85 | aniline-SO₃H (–NH, SO₃H) | aniline-2,5-disulfonic (–NH, SO₃H, HO₃S) | " | " |
| 86 | aniline-SO₃H (–NH, SO₃H) | aminonaphthalenesulfonic acid (–NH, SO₃H) | " | " |
| 87 | 4-aminobenzenesulfonic (–NH, SO₃H para) | aminonaphthalenesulfonic acid (–NH, SO₃H, HO₃S) | " | " |

TABLE I-continued
| Examples | R₁ | R₂ | Chromophore | Hue on cotton |
|---|---|---|---|---|
| 88 | 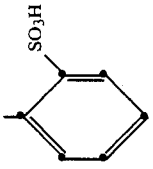 | 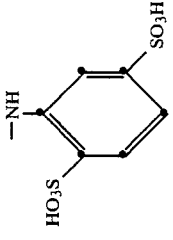 | " | " |
| 89 | | | " | " |
| 90 | | | " | " |
| 91 | 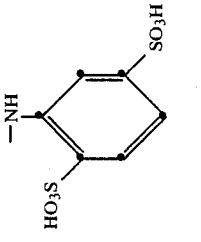 | 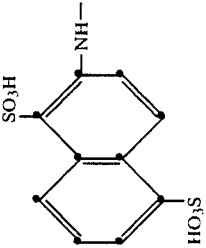 | " | " |

TABLE I-continued
| Examples | R₁ | R₂ | Chromophore | Hue on cotton |
|---|---|---|---|---|
| 92 | 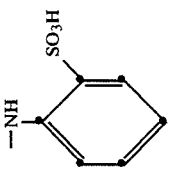 | 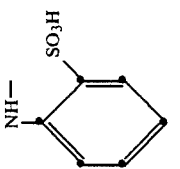 | " | " |
| 93 | —NHCH₂CH₂OH | 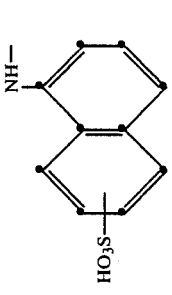 | " | " |
| 94 | HOCH₂CH₂NH— | HOCH₂CH₂NH— | 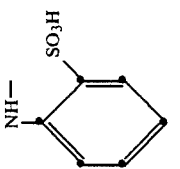 | orange |
| 95 | 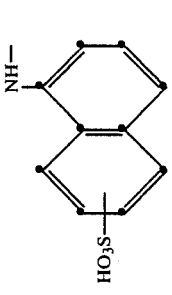 | 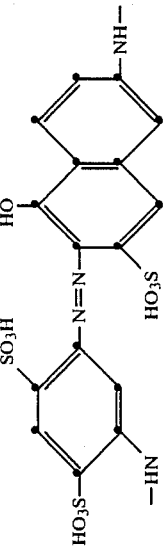 | " | " |
| 96 | 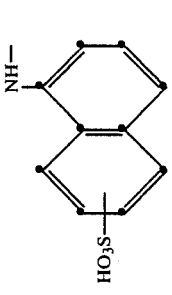 | 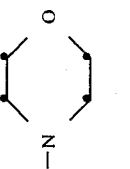 | " | " |

TABLE I-continued
| Examples | R₁ | R₂ | Chromophore | Hue on cotton |
|---|---|---|---|---|
| 97 | 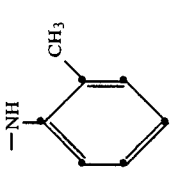 | 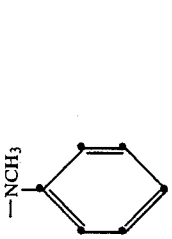 | ″ | ″ |
| 98 | 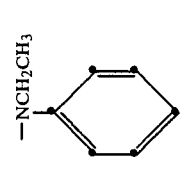 | 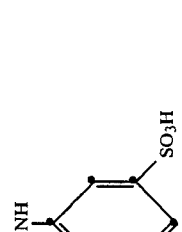 | ″ | ″ |
| 99 | 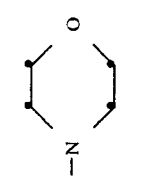 | 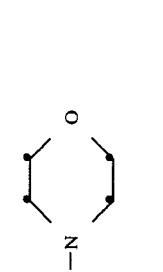 | 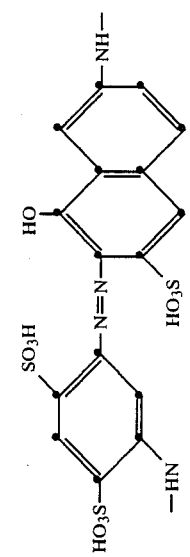 | scarlet |
| 100 | 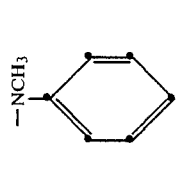 | 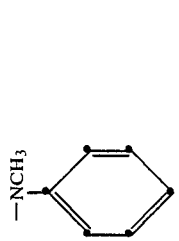 | ″ | ″ |

TABLE I-continued
| Examples | R₁ | R₂ | Chromophore | Hue on cotton |
|---|---|---|---|---|
| 101 | 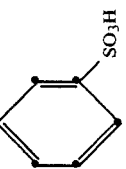 | 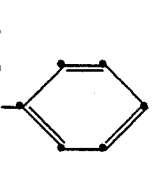 | " | " |
| 102 | 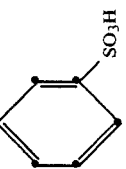 | 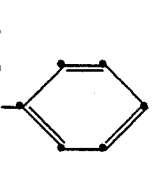 | 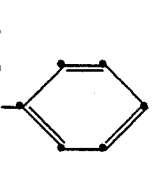 | scarlet |
| 103 | 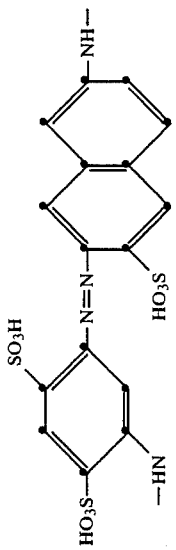 | 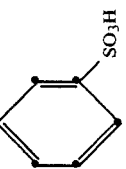 | " | " |
| 104 | 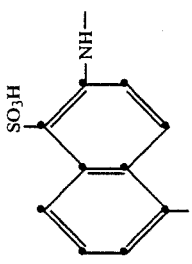 | 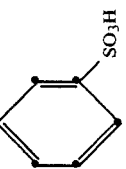 | " | " |
| 105 | —NHCH₂CH₂OH | —NHCH₂CH₂OH | " | " |

EXAMPLE 106

31.9 parts of 1-amino-8-hydroxynaphthalene-3,6-disulfonic acid are dissolved in 800 ml of water under neutral conditions, and the solution is cooled down to 0° to 5° C. At this temperature 14.2 parts of 2,4,6-trifluoro-1,3,5-triazine are added dropwise in the course of 20 minutes during which the reaction solution is held weakly acid to congo red by the simultaneous addition of 2N sodium hydroxide solution. After addition of a mixture of 13.3 parts of N-methylamino-2-methylbenzene with 100 ml of water which has been adjusted to pH 5 the reaction mixture is first briefly held weakly acid to congo red and then at pH 5-6 by the continuous addition of 2N sodium hydroxide solution while the temperature is raised to 20° to 25° C. in the course of 2 to 3 hours. After the reaction has ended this intermediate is coupled at 0° to 10° C. and pH 5 with 45.6 parts of diazotised 2-(3'-amino-4'-sulfophenylamino)-4-fluoro-6-(2"-sulfophenylamino)-1,3,5-triazine. After the coupling reaction at pH 7 has ended the reaction mixture is clarified and the reactive dye which has formed and has the formula

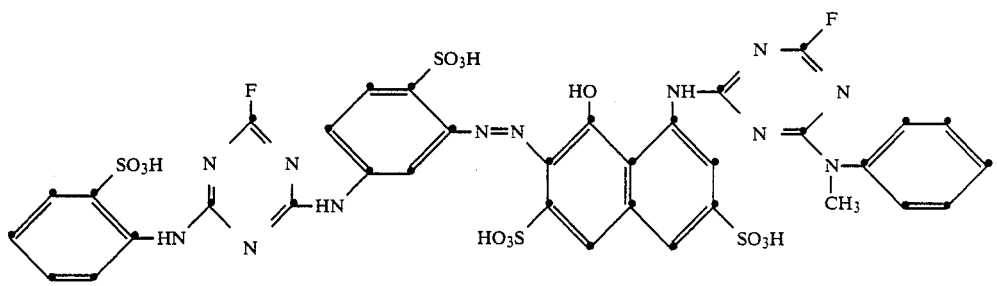

is isolated at pH 7 by evaporating or freeze-drying the reaction solution. It dyes cotton in red shades.

EXAMPLE 107

31.9 parts of 1-amino-8-hydroxynaphthalene-3,6-disulfonic acid are dissolved in 800 ml of water under neutral conditions, and the solution is cooled down to 0° to 5° C. At this temperature 14.2 parts of 2,4,6-trifluoro-1,3,5-triazine are added dropwise in the course of 20 minutes during which the reaction solution is held weakly acid to congo red by the simultaneous addition of 2N sodium hydroxide solution. After addition of a mixture of 12 parts of N-methylaminobenzene with 100 ml of water which has been adjusted to pH 5 the reaction mixture is first briefly held weakly acid to congo red and then at pH 5-6 by the continuous addition of 2N sodium hydroxide solution while the temperature is raised to 20° to 25° C. in the course of 2 to 3 hours. After the reaction has ended this intermediate is coupled at 0° to 10° C. and pH 5 with 45.6 parts of diazotised 2-(3'-amino-4'-sulfophenylamino)-4-fluoro-6-(2"-sulfophenylamino)-1,3,5-triazine. After the coupling reaction at pH 7 has ended the reaction mixture is clarified and the reactive dye which has formed and has the formula

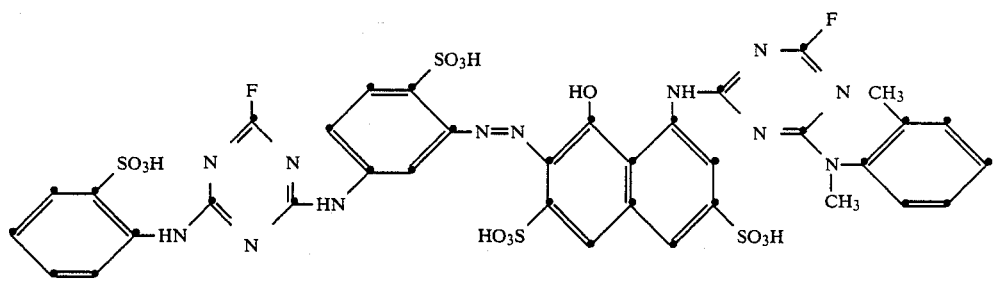

is isolated at pH 7 by evaporating or freeze-drying the reaction solution. It dyes cotton in red shades.

EXAMPLE 108

31.9 parts of 1-amino-8-hydroxynaphthalene-3,6-disulfonic acid are dissolved in 800 ml of water under neutral conditions, and the solution is cooled down to 0° to 5° C. At this temperature 14.2 parts of 2,4,6-trifluoro-1,3,5-triazine are added dropwise in the course of 20 minutes during which the reaction solution is held weakly acid to congo red by the simultaneous addition of 2N sodium hydroxide solution. After addition of a mixture of 14.3 parts of N-ethylamino-2-methylbenzene with 100 ml of water which has been adjusted to pH 5 the reaction mixture is first briefly held weakly acid to congo red and then at pH 5-6 by the continuous addition of 2N sodium hydroxide solution while the temperature is raised to 20° to 25° C. in the course of 2 to 3 hours. After the reaction has ended this intermediate is coupled at 0° to 10° C. and pH 5 with 45.6 parts of diazotised 2-(3'-amino-4'-sulfophenylamino)-4-fluoro-6-(2"-sulfophenylamino)-1,3,5-triazine. After the coupling reaction at pH 7 has ended the reaction mixture is clarified and the reactive dye which has formed and has the formula

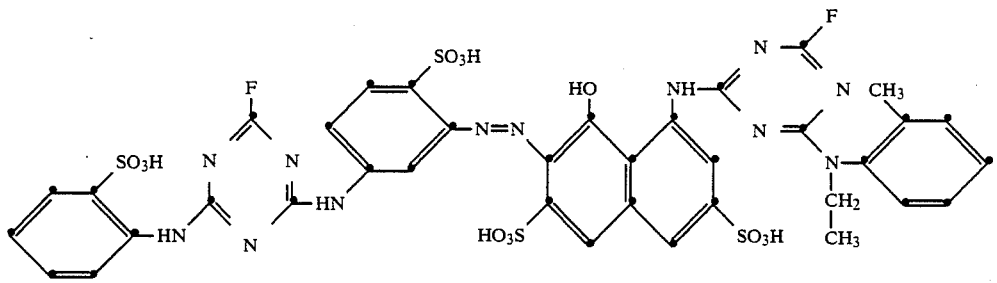

is isolated at pH 7 by evaporating or freeze-drying the reaction solution. It dyes cotton in red shades.

EXAMPLE 109

31.9 parts of 1-amino-8-hydroxynaphthalene-3,6-disulfonic acid are dissolved in 800 ml of water under neutral conditions, and the solution is cooled down to 0° to 5° C. At this temperature 14.2 parts of 2,4,6-trifluoro-1,3,5-triazine are added dropwise in the course of 20 minutes during which the reaction solution is held weakly acid to congo red by the simultaneous addition of 2N sodium hydroxide solution. After addition of a mixture of 14.3 parts of N-ethylamino-3-methylbenzene with 100 ml of water which has been adjusted to pH 5 the reaction mixture is first briefly held weakly acid to congo red and then at pH 5-6 by the continuous addition of 2N sodium hydroxide solution while the temperature is raised to 20° to 25° C. in the course of 2 to 3 hours. After the reaction has ended this intermediate is coupled at 0° to 10° C. and pH 5 with 45.6 parts of diazotised 2-(3'-amino-4'-sulfophenylamino)-4-fluoro-6-(2''-sulfophenylamino)-1,3,5-triazine. After the coupling reaction at pH 7 has ended the reaction mixture is clarified and the reactive dye which has formed and has the formula

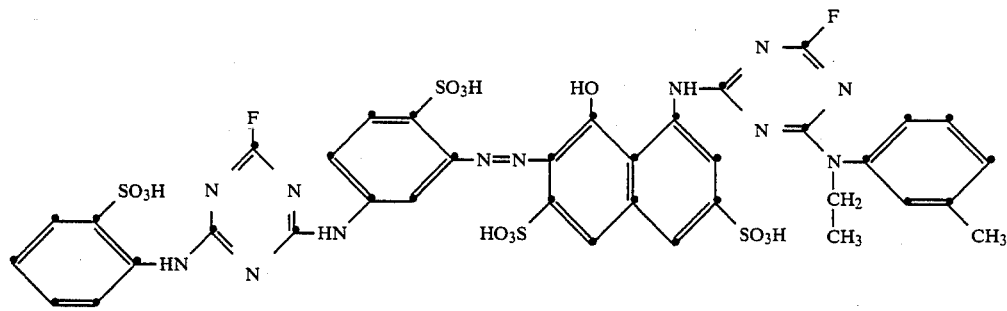

is isolated at pH 7 by evaporating or freeze-drying the reaction solution. It dyes cotton in red shades.

EXAMPLE 110

31.9 parts of 1-amino-8-hydroxynaphthalene-3,6-disulfonic acid are dissolved in 800 ml of water under neutral conditions, and the solution is cooled down to 0° to 5° C. At this temperature 14.2 parts of 2,4,6-trifluoro-1,3,5-triazine are added dropwise in the course of 20 minutes during which the reaction solution is held weakly acid to congo red by the simultaneous addition of 2N sodium hydroxide solution. After addition of a mixture of 13.3 parts of N-ethylaminobenzene with 100 ml of water which has been adjusted to pH 5 the reaction mixture is first briefly held weakly acid to congo red and then at pH 5-6 by the continuous addition of 2N sodium hydroxide solution while the temperature is raised to 20° to 25° C. in the course of 2 to 3 hours. After the reaction has ended this intermediate is coupled at 0° to 10° C. and pH 5 with 45.6 parts of diazotised 2-(3'-amino-4'-sulfophenylamino)-4-fluoro-6-(2''-sulfophenylamino)-1,3,5-triazine. After the coupling reaction at pH 7 has ended the reaction mixture is clarified and the reactive dye which has formed and has the formula

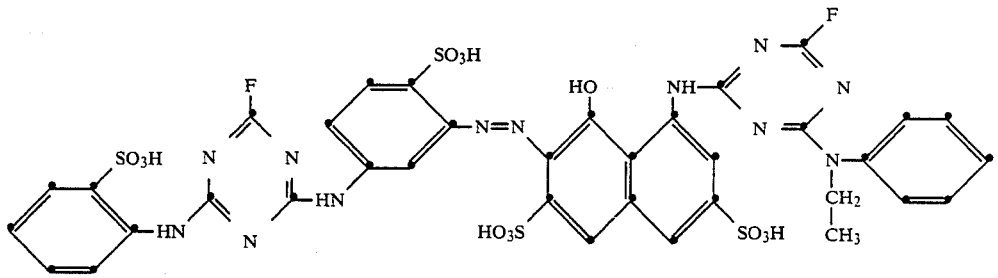

is isolated at pH 7 by evaporating or freeze-drying the reaction solution. It dyes cotton in red shades.

Further useful reactive dyes which dye cotton in the hues given in column 5 of Table II are obtained when, as in Example 110, the coupling component given in column 2 is reacted first with 2,4,6-trifluoro-1,3,5-triazine and then with the amino compound given in column 3, and the diazotised diazo component given in column 4 is coupled onto the intermediate thus obtained.

TABLE II

| Examples | Coupling component | Amino compound | Diazo component | Hue on cotton |
|---|---|---|---|---|
| 111 | 1-Amino-8-hydroxy-naphthalene-3,6-disulfonic acid | N—Ethylaminobenzene | 2-(3'-Amino-4'-sulfophenylamino)-4-fluoro-6-(1''-sulfonaphth-2''-ylamino)-1,3,5-triazine | red |
| 112 | 1-Amino-8-hydroxy-naphthalene-3,6-disulfonic acid | N—Methylaminobenzene | 2-(3'-Amino-4'-sulfophenylamino)-4-fluoro-6-(1''-sulfonaphth-2''-ylamino)-1,3,5-triazine | red |
| 113 | 1-Amino-8-hydroxy-naphthalene-3,6-disulfonic acid | 1-Amino-2-methylbenzene | 2-(3'-Amino-4'-sulfophenylamino)-4-fluoro-6-(1''-sulfonaphth-2''-ylamino)-1,3,5-triazine | red |
| 114 | 1-Amino-8-hydroxy-naphthalene-3,6-disulfonic acid | β-Hydroxyethylamine | 2-(3'-Amino-4'-sulfophenylamino)-4-fluoro-6-(1''-sulfonaphth-2''-ylamino)-1,3,5-triazine | red |
| 115 | 1-Amino-8-hydroxy-naphthalene-3,6-disulfonic acid | 1-Aminobenzene-3-sulfonic acid | 2-(3'-Amino-4'-sulfophenylamino)-4-fluoro-6-(1''-sulfonaphth-2''-ylamino)-1,3,5-triazine | red |
| 116 | 1-Amino-8-hydroxy-naphthalene-3,6-disulfonic acid | β-Sulfoethylamine | 2-(3'-Amino-4'-sulfophenylamino)-4-fluoro-6-(1''-sulfonaphth-2''-ylamino)-1,3,5-triazine | red |
| 117 | 1-Amino-8-hydroxy-naphthalene-3,6-disulfonic acid | 4-Chloroaminobenzene | 2-(3'-Amino-4'-sulfophenylamino)-4-fluoro-6-(1''-sulfonaphth-2''-ylamino)-1,3,5-triazine | red |
| 118 | 1-Amino-8-hydroxy-naphthalene-3,6-disulfonic acid | Aminobenzene | 2-(3'-Amino-4'-sulfophenylamino)-4-fluoro-6-(1''-sulfonaphth-2''-ylamino)-1,3,5-triazine | red |
| 119 | 1-Amino-8-hydroxy-naphthalene-3,6-disulfonic acid | Morpholine | 2-(3'-Amino-4'-sulfophenylamino)-4-fluoro-6-(1''-sulfonaphth-2''-ylamino)-1,3,5-triazine | red |
| 120 | 1-Amino-8-hydroxy-naphthalene-3,6-disulfonic acid | 1-Amino-3-methylbenzene | 2-(3'-Amino-4'-sulfophenylamino)-4-fluoro-6-(1''-sulfonaphth-2''-ylamino)-1,3,5-triazine | red |
| 121 | 1-Amino-8-hydroxy-naphthalene-3,6-disulfonic acid | N—(2-Hydroxyethyl)aminobenzene | 2-(3'-amino-4'-sulfophenylamino)-4-fluoro-6-(1''-sulfonaphth-2''-ylamino)-1,3,5-triazine | red |
| 122 | 1-Amino-8-hydroxy-naphthalene-3,6-disulfonic acid | 3-Chloroaminobenzene | 2-(3'-Amino-4'-sulfophenylamino)-4-fluoro-6-(1''-sulfonaphth-2''-ylamino)-1,3,5-triazine | red |
| 123 | 1-Amino-8-hydroxy-naphthalene-3,6-disulfonic acid | N—Ethylaminobenzene | 2-(3'-Amino-4'-sulfophenylamino)-4-fluoro-6-(1'',5''-disulfonaphth-2''-ylamino)-1,3,5-triazine | red |
| 124 | 1-Amino-8-hydroxy-naphthalene-3,6-disulfonic acid | 1-Amino-3-methylbenzene | 2-(3'-Amino-4'-sulfophenylamino)-4-fluoro-6-(1'',5''-disulfonaphth-2''-ylamino)-1,3,5-triazine | red |
| 125 | 1-Amino-8-hydroxy-naphthalene-3,6-disulfonic acid | N—Methylaminobenzene | 2-(3'-Amino-4'-sulfophenylamino)-4-fluoro-6-(1'',5''-disulfonaphth-2''-ylamino)-1,3,5-triazine | red |
| 126 | 1-Amino-8-hydroxy-naphthalene-3,6-disulfonic acid | 4-Chloroaminobenzene | 2-(3'-Amino-4'-sulfophenylamino)-4-fluoro-6-(2'',5''-disulfophenylamino)-1,3,5-triazine | red |
| 127 | 1-Amino-8-hydroxy-naphthalene-3,6-disulfonic acid | 3-Chloroaminobenzene | 2-(3'-Amino-4'-sulfophenylamino)-4-fluoro-6-(2'',5''-disulfophenylamino)-1,3,5-triazine | red |
| 128 | 1-Amino-8-hydroxy-naphthalene-3,6-disulfonic acid | 1-Amino-4-ethylaniline | 2-(3'-Amino-4'-sulfophenylamino)-4-fluoro-6-(2'',4''-disulfophenylamino)-1,3,5-triazine | red |
| 129 | 1-Amino-8-hydroxy-naphthalene-3,6-disulfonic acid | 4-Chloroaminobenzene | 2-(3'-Amino-4'-sulfophenylamino)-4-fluoro-6-(2'',4''-disulfophenylamino)-1,3,5-triazine | red |
| 130 | 1-Amino-8-hydroxy-naphthalene-3,6-disulfonic acid | Aminobenzene | 2-(3'-Amino-4'-sulfophenylamino)-4-fluoro-6-(2'',4''-disulfophenylamino)-1,3,5-triazine | red |
| 131 | 1-Amino-8-hydroxy-naphthalene-3,6-disulfonic acid | N—Ethylaminobenzene | 2-(3'-Amino-4'-sulfophenylamino)-4-fluoro-6-(2''-chloro-5''-sulfophenylamino)-1,3,5-triazine | red |
| 132 | 1-Amino-8-hydroxy-naphthalene-3,6-disulfonic acid | N—Methylaminobenzene | 2-(3'-Amino-4'-sulfophenylamino)-4-fluoro-6-(2''-sulfophenylamino)-1,3,5-triazine | red |
| 133 | 1-Amino-8-hydroxy-naphthalene-3,6-disulfonic acid | 1-Amino-2-methylbenzene | 2-(3'-Amino-4'-sulfophenylamino)-4-fluoro-6-(2''-sulfophenylamino)-1,3,5-triazine | red |
| 134 | 1-Amino-8-hydroxy-naphthalene-3,6-disulfonic acid | 1-Amino-4-methylbenzene | 2-(3'-Amino-4'-sulfophenylamino)-4-fluoro-6-(2''-sulfophenylamino)-1,3,5-triazine | red |
| 135 | 1-Amino-8-hydroxy-naphthalene-3,6-disulfonic acid | 1-Amino-4-ethylbenzene | 2-(3'-Amino-4'-sulfophenylamino)-4-fluoro-6-(2''-sulfophenylamino)-1,3,5-triazine | red |
| 136 | 1-Amino-8-hydroxy-naphthalene-3,6-disulfonic acid | | | red |

TABLE II-continued

| Examples | Coupling component | Amino compound | Diazo component | Hue on cotton |
|---|---|---|---|---|
| 137 | 1-Amino-8-hydroxy-naphthalene-3,6-disulfonic acid | N—Propylaminobenzene | 2-(3'-Amino-4'-sulfophenylamino)-4-fluoro-6-(2''-sulfophenylamino)-1,3,5-triazine | red |
| 138 | 1-Amino-8-hydroxy-naphthalene-3,6-disulfonic acid | N—Butylaminobenzene | 2-(3'-Amino-4'-sulfophenylamino)-4-fluoro-6-(2''-sulfophenylamino)-1,3,5-triazine | red |
| 139 | 1-Amino-8-hydroxy-naphthalene-3,6-disulfonic acid | 1-Amino-3-methylbenzene | 2-(3'-Amino-4'-sulfophenylamino)-4-fluoro-6-(2''-sulfophenylamino)-1,3,5-triazine | red |
| 140 | 1-Amino-8-hydroxy-naphthalene-3,6-disulfonic acid | 1-Amino-4-methylbenzene | 2-(3'-Amino-4'-sulfophenylamino)-4-fluoro-6-(2''-sulfophenylamino)-1,3,5-triazine | red |
| 141 | 1-Amino-8-hydroxy-naphthalene-3,6-disulfonic acid | Morpholine | 2-(3'-Amino-4'-sulfophenylamino)-4-fluoro-6-(2''-sulfophenylamino)-1,3,5-triazine | red |
| 142 | 1-Amino-8-hydroxy-naphthalene-3,6-disulfonic acid | 4-Chloroaminobenzene | 2-(3'-Amino-4'-sulfophenylamino)-4-fluoro-6-(2''-sulfophenylamino)-1,3,5-triazine | red |
| 143 | 1-Amino-8-hydroxy-naphthalene-3,6-disulfonic acid | 3-Chloroaminobenzene | 2-(3'-Amino-4'-sulfophenylamino)-4-fluoro-6-(2''-sulfophenylamino)-1,3,5-triazine | red |
| 144 | 1-Amino-8-hydroxy-naphthalene-3,6-disulfonic acid | N—(2-Hydroxyethyl)aminobenzene | 2-(3'-Amino-4'-sulfophenylamino)-4-fluoro-6-(2''-sulfophenylamino)-1,3,5-triazine | red |
| 145 | 1-Amino-8-hydroxy-naphthalene-3,6-disulfonic acid | Aminobenzene | 2-(3'-Amino-4'-sulfophenylamino)-4-fluoro-6-(2''-sulfophenylamino)-1,3,5-triazine | red |
| 146 | 1-Amino-8-hydroxy-naphthalene-4,6-disulfonic acid | N—Ethylaminobenzene | 2-(3'-Amino-4'-sulfophenylamino)-4-fluoro-6-(2''-sulfophenylamino)-1,3,5-triazine | yellowish red |
| 147 | 1-Amino-8-hydroxy-naphthalene-4,6-disulfonic acid | 1-Amino-2-methylbenzene | 2-(3'-Amino-4'-sulfophenylamino)-4-fluoro-6-(1''-sulfonaphth-2''-ylamino)-1,3,5-triazine | yellowish red |
| 148 | 1-Amino-8-hydroxy-naphthalene-4,6-disulfonic acid | 4-Chloroaminobenzene | 2-(3'-Amino-4'-sulfophenylamino)-4-fluoro-6-(1'',5''-disulfonaphth-2''-ylamino)-1,3,5-triazine | yellowish red |
| 149 | 1-Amino-8-hydroxy-naphthalene-4,6-disulfonic acid | 1-Amino-4-acetaminobenzene | 2-(3'-Amino-4'-sulfophenylamino)-4-fluoro-6-(2'',5''-disulfonaphth-2''-ylamino)-1,3,5-triazine | yellowish red |
| 150 | 1-Amino-8-hydroxy-naphthalene-4,6-disulfonic acid | 3-Chloroaminobenzene | 2-(3'-Amino-4'-sulfophenylamino)-4-fluoro-6-(2'',4''-disulfophenylamino)-1,3,5-triazine | yellowish red |
| 151 | 1-Amino-8-hydroxy-naphthalene-4,6-disulfonic acid | N—Methylaniline | 2-(3'-Amino-4'-sulfophenylamino)-4-fluoro-6-(2''-chloro-5''-sulfophenylamino)-1,3,5-triazine | yellowish red |
| 152 | 1-Amino-8-hydroxy-naphthalene-4,6-disulfonic acid | Aminobenzene | 2-(3'-Amino-4'-sulfophenylamino)-4-fluoro-6-(3'',6''-disulfonaphth-2''-ylamino)-1,3,5-triazine | yellowish red |
| 153 | 1-Amino-8-hydroxy-naphthalene-4,6-disulfonic acid | 1-Amino-3-acetaminobenzene | 2-(3'-Amino-4'-sulfophenylamino)-4-fluoro-6-(3'',6''-disulfonaphth-2''-ylamino)-1,3,5-triazine | yellowish red |
| 154 | 1-Amino-8-hydroxy-naphthalene-4,6-disulfonic acid | 1-Amino-4-methylbenzene-2-sulfonic acid | 2-(3'-Amino-4'-sulfophenylamino)-4-fluoro-6-(3'',6''-disulfonaphth-2''-ylamino)-1,3,5-triazine | yellowish red |
| 155 | 1-Amino-8-hydroxy-naphthalene-4,6-disulfonic acid | 4-Chloroaminobenzene | | bluish red |

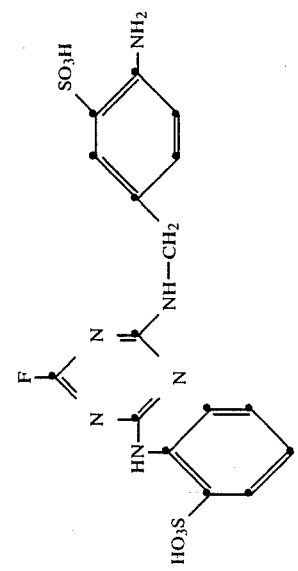

TABLE II-continued

| Examples | Coupling component | Amino compound | Diazo component | Hue on cotton |
|---|---|---|---|---|
| 156 | 1-Amino-8-hydroxy-naphthalene-4,6-disulfonic acid | 4-Chloroaminobenzene | | bluish red |
| 157 | 1-Amino-8-hydroxy-naphthalene-4,6-disulfonic acid | Aminobenzene | | bluish red |
| 158 | 1-Amino-8-hydroxy-naphthalene-4,6-disulfonic acid | Aminobenzene | | bluish red |

TABLE II-continued

| Examples | Coupling component | Amino compound | Diazo component | Hue on cotton |
|---|---|---|---|---|
| 159 | 1-Amino-8-hydroxy-naphthalene-4,6-disulfonic acid | Monoethanolamine |  | bluish red |
| 160 | 1-Amino-8-hydroxy-naphthalene-4,6-disulfonic acid | Morpholine |  | " |
| 161 | 1-Amino-8-hydroxy-naphthalene-4,6-disulfonic acid | Morpholine |  | " |
| 162 | 1-Amino-8-hydroxy-naphthalene-4,6-disulfonic acid | N—Methylaminobenzene | " | " |
| 163 | 1-Amino-8-hydroxy-naphthalene-4,6-disulfonic acid | 1-Aminobenzene-3-sulfonic acid | " | " |
| 164 | 1-Amino-8-hydroxy-naphthalene-4,6-disulfonic acid | Monoethanolamine | " | " |
| 165 | 1-Amino-8-hydroxy-naphthalene-4,6-disulfonic acid | Monoethanolamine |  | " |

EXAMPLE 166

2.0 parts of cyanuric fluoride in 5 parts of toluene are rapidly added dropwise at about 0° with intensive stirring to a neutral solution of 3.46 parts of aniline-2-sulfonic acid in 100 ml of water while pH 6-7 is maintained by the simultaneous dropwise addition of 2N NaOH. After the condensation has taken place 5.36 parts of 1,4-phenylenediamine-2,5-disulfonic acid are added in solid form and a second condensation reaction is carried out at 0°-15° and pH 6-7 by adding 2N NaOH.

The solution obtained is diazotised at 0°-5° with 8 ml of concentrated HCl and 20 ml of 1N sodium nitrite. 4.46 parts of 1-naphthylamine-6-sulfonic acid are then added in solid form and coupled at 0°-15° during the course of a number of hours during which pH 3.5-5 is maintained with 2N NaOH.

The monoazo reactive dye obtained is diazotised at 0°-5° with 5 ml of concentrated HCl and 20 ml of 1N sodium nitrite. 2.14 parts of m-toluidine are added dropwise and coupled at 0°-15° overnight while pH 3.5-5 is maintained with 2N NaOH. The partially precipitated disazo dye is dissolved with 2N NaOH under neutral conditions.

Finally, reactive acylation is performed at about 0° with intensive stirring by the dropwise addition of 2.0 parts of cyanuric fluoride in 5 parts of toluene, and a second condensation is then carried out at 0°-15° by adding 3.46 parts of aniline-3-sulfonic acid in solid form. In both cases pH 6—7 is maintained by adding 2N NaOH. The finished dye is salted out by adding 10% by volume of sodium chloride and is filtered off. The paste is buffered with 1 part of disodium hydrogenphosphate and is dried at 40°-50°.

EXAMPLE 167

5.36 parts of 1,4-phenylendiamine-2,5-disulfonic acid are reactively acylated at 0° in 100 ml of water by the dropwise addition of 2.0 parts of cyanuric fluoride while pH 6-7 is maintained with 2N NaOH.

3.23 parts of taurine hydrochloride dissolved in 40 ml of cold water are then added and condensed at 0°-10° while pH 7.5-8.5 is maintained by the dropwise addition of 2N NaOH.

After the condensation has ended a diazotisation is carried out, as described in Example 166, and the diazotised product is coupled first onto 4.46 parts of 1-naphthylamine-6-sulfonic acid and, after another diazotisation, onto 2.14 parts of m-toluidine.

After the coupling has ended a reaction is carried out as described in Example 166 with 1.25 mole equivalents of a condensate prepared from aniline-2-sulfonic acid and cyanuric fluoride. pH 6-7 is maintained by the dropwise addition of 2N NaOH. The temperature is 0°-20°. The finished dye is salted out with 10% by volume of sodium chloride, is buffered with 1 part of sodium dihydrogenphosphate, and is dried at 40°-50°.

The dyes described in Examples 166 and 167 dye cellulose fibres in yellowish brown shades. Further examples are given in Table III below. They are prepared analogously to Examples 166 and 167. The products are useful dyes which have yellowish to bluish brown hues on cellulose fibres.

TABLE III

| | 1st Triazine substituent | Start component | Middle component | End component | 2nd Triazine substituent |
|---|---|---|---|---|---|
| 168 | Aniline-2-sulfonic acid | 1,4-Phenylenediamine-2,5-disulfonic acid | 1-Naphthylamine-6-sulfonic acid | 3-Methylaniline | Aniline-2-sulfonic acid |
| 169 | 4-Aminotoluene-3-sulfonic acid | 1,4-Phenylenediamine-2,5-disulfonic acid | 1-Naphthylamine-6-sulfonic acid | 3-Methylaniline | 4-Aminotoluene-3-sulfonic acid |
| 170 | Aniline-2,5-disulfonic acid | 1,4-Phenylenediamine-2,5-disulfonic acid | 1-Naphthylamine-6-sulfonic acid | 3-Methylaniline | Aniline-2,5-disulfonic acid |
| 171 | Aniline-2,5-disulfonic acid | 1,4-Phenylenediamine-2,5-disulfonic acid | 1-Naphthylamine-6-sulfonic acid | 3-Methylaniline | Ammonia |
| 172 | Aniline-2,5-disulfonic acid | 1,4-Phenylenediamine-2,5-disulfonic acid | 1-Naphthylamine-6-sulfonic acid | 3-Methylaniline | o-Toluidine |
| 173 | Aniline-3-sulfonic acid | 1,4-Phenylenediamine-2,5-disulfonic acid | 1-Naphthylamine-6-sulfonic acid | 3-Methylaniline | Aniline-2-sulfonic acid |
| 174 | Aniline-2-sulfonic acid | 1,4-Phenylenediamine-2,5-disulfonic acid | 1-Naphthylamine-7-sulfonic acid | 3-Methylaniline | Aniline-2-sulfonic acid |
| 175 | Aniline-2-sulfonic acid | 1,4-Phenylenediamine-2,5-disulfonic acid | 1-Naphthylamine-6-sulfonic acid | 2,5-Dimethylaniline | Aniline-2-sulfonic acid |
| 176 | Aniline-2-sulfonic acid | 1,4-Phenylenediamine-2,5-disulfonic acid | 1-Naphthylamine-6-sulfonic acid | 5-Methyl-2-methoxyaniline | Aniline-2-sulfonic acid |
| 177 | Aniline-2-sulfonic acid | 1,4-Phenylenediamine-2,5-disulfonic acid | 1-Naphthylamine-6-sulfonic acid | 3-Methoxy-aniline | Aniline-2-sulfonic acid |
| 178 | Aniline-2-sulfonic acid | 1,4-Phenylenediamine-2,5-disulfonic acid | 1-Naphthylamine-6-sulfonic acid | 3-Ureidoaniline | Aniline-2-sulfonic acid |
| 179 | Aniline-2-sulfonic acid | 1,4-Phenylenediamine-2,5-disulfonic acid | 1-Naphthylamine-6-sulfonic acid | 3-Acetylamino-aniline | Aniline-2-sulfonic acid |
| 180 | Aniline-2-sulfonic acid | 1,3-Phenylenediamine-4,6-disulfonic acid | 1-Naphthylamine-6-sulfonic acid | 3-Methylaniline | Aniline-2-sulfonic acid |
| 181 | Aniline-2-sulfonic acid | 1,3-Phenylenediamine-4,6-disulfonic acid | 1-Naphthylamine-6-sulfonic acid | 3-Methylaniline | Aniline-2,5-disulfonic acid |
| 182 | Aniline-2-sulfonic acid | 1,4-Phenylenediamine-2,5-disulfonic acid | 2,5-Dimethylaniline | 3-Methylaniline | Aniline-2,5-disulfonic acid |

EXAMPLE 183

5.36 parts of 1,4-phenylenediamine-2,5-disulfonic acid are dissolved in 100 ml of water under neutral conditions. 20 ml of 2N sodium nitrite are added. Diazotisation is then carried out at 0°-5° by rapidly adding 7 ml of concentrated HCl. 4.46 parts of 1-naphthylamine-6-sulfonic acid are added in solid form and are coupled at 0°-15° while pH 3-4 is maintained by the dropwise addition of 2N NaOH. After the coupling has ended the pH is neutralised with 2N NaOH.

The monoazo dye obtained is selectively acylated at the nitrogen atom of the naphthylaminesulfonic acid at 5°-20° with 1.5 mole equivalents of a condensate of aniline-2-sulfonic acid and cyanuric fluoride (see Example 166). pH 6–7 is maintained at 2N NaOH.

After the acylation has ended the product is diazotised at 0°–5° by adding 20 ml of 1N sodium nitrite and 8 ml of concentrated HCl. 2.14 parts of m-toluidine are added dropwise and are coupled at 0°–15° while pH 3–4 is maintained by adding 2N NaOH. After the coupling has ended the suspension is dissolved under neutral conditions with 2N NaOH. It is then acylated at 0°–20° with 1.25 mole equivalents of a condensate of aniline-2-sulfonic acid and cyanuric fluoride while pH 6–7 is maintained with 2N NaOH. The finished dye is salted out with 10% by volume of sodium chloride, is buffered with 1 part of disodium hydrogenphosphate, and is dried at 40°–50°.

Further dyes of this type are given in Table IV. They dye cellulose fibres in yellowish to reddish brown shades. They are prepared analogously to Example 183. The triazine substituents can also be simple amines, i.e. both the monoazo dye intermediate and the disazo monoreactive dye can also be reacted directly with fluorotriazine in the first place and with an amine in the 2nd place.

neous dropwise addition of 2N NaOH. After the condensation has taken place 5.36 parts of 1,3-phenylenediamine-4,6-disulfonic acid are added in solid form, and a second condensation is carried out at 0°–15° and pH 6–7 by adding 2N NaOH. The solution obtained is diazotised at 0°–5° with 8 ml of concentrated HCl and 20 ml of 1N sodium nitrite and is added dropwise to a suspension of 4.78 parts of 2-amino-8-naphthol-6-sulfonic acid in 100 ml of water while pH 4–4.5 is maintained with 2N NaOH. After the coupling has ended the dye is salted out with 5% by volume of sodium chloride, is filtered off, and is dried at 40°–50°.

15.72 parts of the monoazo reactive dye described above are diazotised at 0° with 20 ml of 1N sodium nitrite and 5 ml of concentrated HCl. 2.14 parts of m-toluidine are added while pH 4–5 is maintained by adding 2N NaOH.

After the coupling has ended the product is reactively acylated with 1.5 mole equivalents of a condensate prepared from aniline-2-sulfonic acid and cyanuric fluoride at pH 6–7, maintained by the dropwise addition of 2N NaOH. The finished dye is salted out with 5% by volume of sodium chloride and is filtered off. The paste

TABLE IV

| | 1st Triazine substituent | Start component | Middle component | End component | 2nd Triazine substituent |
|---|---|---|---|---|---|
| 184 | Aniline-3-sulfonic acid | 1-Naphthylamine-6-sulfonic acid | 1,4-Phenylenediamine-2,5-disulfonic acid | 3-Methylaniline | Aniline-2-sulfonic acid |
| 185 | Aniline-3-sulfonic acid | 1-Naphthylamine-6-sulfonic acid | 1,4-Phenylenediamine-2,5-disulfonic acid | 3-Methylaniline | 4-aminotoluene-3-sulfonic acid |
| 186 | Aniline-3-sulfonic acid | 1-Naphthylamine-6-sulfonic acid | 1,4-Phenylenediamine-2,5-disulfonic acid | 3-Methylaniline | Aniline-2,5-disulfonic acid |
| 187 | Ammonia | 1-Naphthylamine-6-sulfonic acid | 1,4-Phenylenediamine-2,5-disulfonic acid | 3-Methylaniline | Aniline-2,5-disulfonic acid |
| 188 | Taurine | 1-Naphthylamine-6-sulfonic acid | 1,4-Phenylenediamine-2,5-disulfonic acid | 3-Methylaniline | Aniline-2-sulfonic acid |
| 189 | Aniline-2-sulfonic acid | 1-Naphthylamine-6-sulfonic acid | 1,4-Phenylenediamine-2,5-disulfonic acid | 3-Methylaniline | Aniline-2,5-disulfonic acid |
| 190 | Aniline-2-sulfonic acid | 1-Naphthylamine-7-sulfonic acid | 1,4-Phenylenediamine-2,5-disulfonic acid | 3-Methylaniline | Aniline-2-sulfonic acid |
| 191 | Taurine | 1-Naphthylamine-6-sulfonic acid | 1,4-Phenylenediamine-2,5-disulfonic acid | 2,5-Dimethylaniline | Aniline-2-sulfonic acid |
| 192 | Taurine | 1-Naphthylamine-6-sulfonic acid | 1,4-Phenylenediamine-2,5-disulfonic acid | 5-Methyl-2-methoxyaniline | Aniline-2-sulfonic acid |
| 193 | Taurine | 1-Naphthylamine-6-sulfonic acid | 1,4-Phenylenediamine-2,5-disulfonic acid | 3-Methoxyaniline | Aniline-2-sulfonic acid |
| 194 | Taurine | 1-Naphthylamine-6-sulfonic acid | 1,4-Phenylenediamine-2,5-disulfonic acid | 3-Ureidoaniline | Aniline-2-sulfonic acid |
| 195 | Taurine | 1-Naphthylamine-6-sulfonic acid | 1,4-Phenylenediamine-2,5-disulfonic acid | 3-Acetylaminoaniline | Aniline-2-sulfonic acid |
| 196 | Aniline-2-sulfonic acid | 1-Naphthylamine-6-sulfonic acid | 1,3-Phenylenediamine-4,6-disulfonic acid | 3-Methylaniline | Aniline-2-sulfonic acid |
| 197 | Aniline-2,5-disulfonic acid | 1-Naphthylamine-6-sulfonic acid | 1,3-Phenylenediamine-4,6-disulfonic acid | 3-Methylaniline | Ammonia |
| 198 | Aniline-2-sulfonic acid | 3-Methylaniline | 1,4-Phenylenediamine-2,5-disulfonic acid | 3-Methylaniline | Aniline-2,5-disulfonic acid |
| 199 | Aniline-2-sulfonic acid | 3-Ureidoaniline | 1,4-Phenylenediamine-2,5-disulfonic acid | 3-Methylaniline | Aniline-2,5-disulfonic acid |

EXAMPLE 200

2.0 parts of cyanuric fluoride in 5 parts of toluene are rapidly added dropwise at 0° with intensive stirring to a solution of 3.46 parts of aniline-2-sulfonic acid in 100 ml of water, while pH 6–7 is maintained by the simultaobtained is buffered with 1 part of disodium hydrogenphosphate and is dried at 40°–50°. The result is a dye which dyes cellulose fibres in red shades.

Table V, below, lists further dyes which can be prepared on the same principle. They produce red to bluish red dyeings on cellulose fibres.

TABLE V

| | 1st Triazine substituent | Start component | Middle component | End component | 2nd Triazine substituent |
|---|---|---|---|---|---|
| 201 | Aniline-2-sulfonic acid | 1,3-Phenylenediamine-4,6-disulfonic acid | 2-Amino-8-naphthol-4,6-disulfonic acid | 3-Methylaniline | Aniline-2-sulfonic acid |
| 202 | Aniline-2-sulfonic acid | 1,3-Phenylenediamine-4,6-disulfonic acid | 2-Amino-5-naphthol-7-sulfonic acid | 3-Methylaniline | Aniline-2-sulfonic acid |
| 203 | Aniline-2-sulfonic acid | 1,4-Phenylenediamine-2,5-disulfonic acid | 2-Amino-8-naphthol-6-sulfonic acid | 3-Methylaniline | Aniline-2-sulfonic acid |
| 204 | Aniline-2-sulfonic acid | 1,4-Phenylenediamine- | 2-Amino-8-naphthol- | 3-Methyl- | Aniline-2-sulfonic acid |

TABLE V-continued

| | 1st Triazine substituent | Start component | Middle component | End component | 2nd Triazine substituent |
|---|---|---|---|---|---|
| 205 | Aniline-2-sulfonic acid | 2,5-disulfonic acid 1,4-Phenylenediamine-2,5-disulfonic acid | 4,6-disulfonic acid 2-Amino-5-naphthol-7-sulfonic acid | aniline 3-Methyl-aniline | Aniline-2-sulfonic acid |
| 206 | Aniline-2-sulfonic acid | 2-Amino-5-amino-methylnaphthalene-1,7-disulfonic acid | 2-Amino-8-naphthol-6-sulfonic acid | 3-Methyl-aniline | Aniline-2-sulfonic acid |
| 207 | Aniline-2-sulfonic acid | 2-Amino-6-nitro-naphthalene-4,8-disulfonic acid (coupled first and reduced) | 1-Naphthylamine-6-sulfonic acid | 3-Methyl-aniline | Aniline-3-sulfonic acid |

EXAMPLE 208

6.64 parts of 5-aminomethyl-2-naphthylamine-1,7-disulfonic acid are reacted as in Example 166 with a condensate of 2.0 parts of cyanuric fluoride and 3.46 parts of aniline-2-sulfonic acid, and the product is then diazotised and coupled onto 4.46 parts of 1-naphthylamine-6-sulfonic acid. The monoazo dye obtained is again diazotised and coupled onto 2.14 parts of 3-methylaniline. The product is finally reactively acylated with a condensate of cyanuric fluoride and aniline-2,5-disulfonic acid and is worked up as in Example 166. The result is a dye which dyes cellulose fibres in reddish brown shades.

A similar dye is obtained when 2.42 parts of 2,5-dimethylaniline are used in place of 1-naphthylamine-6-sulfonic acid.

EXAMPLE 209

5.36 parts of 1,4-phenylenediamine-2,5-disulfonic acid are reactively acylated as in Example 166 with 2.0 parts of cyanuric fluoride and 3.46 parts of aniline-2-sulfonic acid, and the product is then diazotised. 3.02 parts of 3-aminophenylurea are then homogenised in 25 ml of water by thorough stirring, and the suspension is introduced into the above reaction solution. The coupling reaction is carried out at a temperature of 0°–15° and pH 3–4 is maintained by adding 2N NaOH. After the coupling has ended the mixture is neutralised with 2N NaOH whereupon everything dissolves.

The product is then reactively acylated as described in Example 167 with 1.25 mole equivalents of a condensate of aniline-2-sulfonic acid and cyanuric fluoride. The partially precipitated dye is salted out with 10% by volume of sodium chloride, is filtered off, is buffered with 1 part of sodium dihydrogenphosphate, and is dried at 40°–50°. It dyes cellulose fibres in golden yellow to orange shades.

Further examples are listed in Table VI below. Their preparation follows from what has been said so far. They dye cotton in yellow to orange shades.

TABLE VI

| | 1st Triazine substituent | Diazo component | Coupling component | 2nd Triazine substituent |
|---|---|---|---|---|
| 210 | Aniline-2-sulfonic acid | 1,4-Phenylenediamine-2,5-disulfonic acid | 3-Methylaniline | Aniline-2-sulfonic acid |
| 211 | Aniline-2,5-disulfonic acid | 1,4-Phenylenediamine-2,5-disulfonic acid | 1-Ureidoaniline | Ammonia |
| 212 | Aniline-2,5-disulfonic acid | 1,4-Phenylenediamine-2,5-disulfonic acid | 1-Ureidoaniline | o-toluidine |
| 213 | Aniline-2,5-disulfonic acid | 1,4-Phenylenediamine-2,5-disulfonic acid | 1-Ureidoaniline | Semicarbazide |
| 214 | Aniline-2-sulfonic acid | 1,4-Phenylenediamine-2,5-disulfonic acid | 1-Ureidoaniline | Aniline-3-sulfonic acid |
| 215 | Taurine | 1,4-Phenylenediamine-2,5-disulfonic acid | 1-Ureidoaniline | Aniline-2-sulfonic acid |
| 216 | 4-Aminotoluene-3-sulfonic acid | 1,4-Phenylenediamine-2,5-disulfonic acid | 1-Ureidoaniline | Taurine |
| 217 | Aniline-3-sulfonic acid | 1,4-Phenylenediamine-2,5-disulfonic acid | 1-Ureidoaniline | Aniline-3-sulfonic acid |
| 218 | Aniline-2,5-disulfonic acid | 1,4-Phenylenediamine-2,5-disulfonic acid | 3-Ureidoaniline | Taurine |
| 219 | Aniline-2,5-disulfonic acid | 1,4-Phenylenediamine-2,5-disulfonic acid | 2,5-Dimethylaniline | Ammonia |
| 220 | Aniline-2-sulfonic acid | 1,4-Phenylenediamine-2,5-disulfonic acid | 5-Methyl-2-methoxy-aniline | Semicarbazide |
| 221 | Aniline-2-sulfonic acid | 1,4-Phenylenediamine-2,5-disulfonic acid | 5-Methoxyaniline | Aniline-3-sulfonic acid |
| 222 | Aniline-2-sulfonic acid | 1,4-Phenylenediamine-2,5-disulfonic acid | 3-Acetylamino-aniline | Aniline-3-sulfonic acid |
| 223 | Aniline-2-sulfonic acid | 1,3-Phenylenediamine-4,6-disulfonic acid | 3-Ureidoaniline | Aniline-3-sulfonic acid |
| 224 | Aniline-2,5-disulfonic acid | 1,3-Phenylenediamine-4,6-disulfonic acid | 3-Ureidoaniline | Aniline-3-sulfonic acid |
| 225 | Aniline-2-sulfonic acid | 5-aminomethyl-2-naphthylamine-1,7-disulfonic acid | 3-Methylaniline | Aniline-3-sulfonic acid |
| 226 | Aniline-2,5-disulfonic acid | 5-Aminomethyl-2-naphthylamine-1-sulfonic acid | 3-Methylaniline | Aniline-3-sulfonic acid |

EXAMPLE 227

3.46 parts of aniline-2-sulfonic acid are reactively acylated as described in Example 166 with 2.0 parts of cyanuric fluoride. 2.16 parts of m-phenylenediamine dissolved at pH 4.0 with 2N HCl and 20 ml of water are then added and are condensed at 0° in the course of 15 minutes during which pH 4.0–4.5 is maintained with 2N NaOH.

3.46 parts of aniline-2,5-disulfonic acid are dissolved at pH 8.0 with 2N NaOH in 100 ml of water. The solution is diazotised at 0° to 5° with 5 ml of HCl and 20 ml of 1N sodium nitrite. The diazo is poured into the above suspension and is coupled at 0° to 10° for 3 hours. pH 4–6 is maintained with 2N NaOH.

The reaction solution is reactively acylated as described in Example 167 with 2.0 parts of cyanuric fluoride and then with 3.23 parts of taurine hydrochloride. The finished dye is salted out with 10% by volume of sodium chloride and is filtered off. The paste, buffered with 1 parts of disodium hydrogenphosphate, is dried at 40° to 50°.

The dye obtained dyes cellulose fibres yellow. Table VII, below, lists further dyes which are prepared analogously to Example 227, the coupling component in all cases being m-phenylenediamine. This gives useful dyes which have yellow hues on cellulose fibres.

TABLE VII

| No. | 1st Triazine substituent | Diazo component | 2nd Triazine substituent |
|---|---|---|---|
| 228 | Aniline-2-sulfonic acid | Aniline-2,5-disulfonic acid | Aniline-3-sulfonic acid |
| 229 | Aniline-2-sulfonic acid | Aniline-2,5-disulfonic acid | Semicarbazide |
| 230 | Aniline-2-sulfonic acid | Aniline-2,5-disulfonic acid | N—Methyltaurine |
| 231 | Aniline-2-sulfonic acid | Aniline-2,5-disulfonic acid | o-Toluidine |
| 232 | Aniline-2,5-disulfonic acid | Aniline-2,5-disulfonic acid | N—Methylaniline |
| 233 | 2-Aminonaphthalene-1,5-disulfonic acid | Aniline-2,5-disulfonic acid | Semicarbazide |
| 234 | Aniline-2-sulfonic acid | 2-Naphthylamine-3,6,8-trisulfonic acid | Ammonia |
| 235 | Aniline-2-sulfonic acid | 2-Naphthylamine-4,6,8-trisulfonic acid | Semicarbazide |
| 236 | Aniline-2,5-disulfonic acid | 2-Naphthylamine-1,5-disulfonic acid | Aniline-3-sulfonic acid |
| 237 | Aniline-2,5-disulfonic acid | 2-Naphthylamine-4,8-disulfonic acid | Taurine |
| 238 | Aniline-2-sulfonic acid | Aniline-2,4-disulfonic acid | Aniline-3-sulfonic acid |
| 239 | Aniline-3-sulfonic acid | Aniline-2,5-disulfonic acid | Semicarbazide |
| 240 | Taurine | Aniline-2,5-disulfonic acid | Ammonia |

DYEING METHOD I 2 parts of the dye obtained in Example 1 are dissolved in 400 parts of water; to the solution are added 1,500 parts of a solution which contains per liter 53 g of sodium chloride. 100 parts of a cotton fabric are put into this dyebath at 40° C. After 45 minutes 100 parts of a solution which contains per liter 16 g of sodium hydroxide and 20 g of calcined sodium carbonate are added. The temperature of the dyebath is maintained at 40° C. for a further 45 minutes. The dyed fabric is then rinsed, is soaped off at the boil with a non-ionic detergent in the course of a quarter of an hour, is rinsed once more, and is dried.

DYEING METHOD II 2 parts of the reactive dye obtained in Example 1 are dissolved in 400 parts of water; to this solution are added 1,500 parts of a solution which contains per liter 53 g of sodium chloride. 100 parts of a cotton fabric are put at 35° C. into this dyebath. After 20 minutes 100 parts of a solution which contains per liter 16 g of sodium hydroxide and 20 g of calcined sodium carbonate are added. The temperature of the dyebath is maintained at 35° C. for a further 15 minutes. The temperature is then raised to 60° C. in the course of 20 minutes. The temperature is maintained at 60° C. for a further 35 minutes. The fabric is then rinsed, is soaped off at the boil with a non-ionic detergent in the course of a quarter of an hour, is rinsed once more, and is dried.

DYEING METHOD III 4 parts of the reactive dye obtained in Example 1 are dissolved in 50 parts of water. To this solution are added 50 parts of a solution which contains per liter 5 g of sodium hydroxide and 20 g of calcined sodium carbonate. The resulting solution is used to pad-mangle a cotton fabric in such a way that its weight increases by 70%, and the fabric is then wound onto a beam. At this stage the cotton fabric is left to stand at room temperature for 3 hours. The dyed fabric is then rinsed, is soaped off at the boil with a non-ionic detergent in the course of a quarter of an hour, is rinsed once more and is dried.

DYEING METHOD IV 6 parts of the reactive dye obtained in Example 1 are dissolved in 50 parts of water. To this solution are added 50 parts of a solution which contains per liter 16 g of sodium hydroxide and 0.1 liter of sodium silicate. The resulting solution is used to pad-mangle a cotton fabric in such a way that its weight increases by 70%, and the fabric is then wound onto a beam. In this state the cotton fabric is left to stand at room temperature for 10 hours. The dyed fabric is then rinsed, is soaped off at the boil with a nonionic detergent in the course of a quarter of an hour, is rinsed once more, and is dried.

DYEING METHOD V 2 parts of the reactive dye obtained in Example 1 are dissolved in 100 parts of water in the presence of 0.5 part of sodium m-nitrobenzenesulfonate. The resulting solution is used to impregnate a cotton fabric in such a way that its weight increases by 75%, and the fabric is then dried. The fabric is then impregnated with a warm solution at 20° C. which contains per liter 4 grams of sodium hydroxide and 300 grams of sodium chloride, and is squeezed down to a 75% liquor pick-up, and the dyeing is steamed at 100° to 102° C. for 30 seconds, is rinsed, is soaped off in a 0.3% boiling solution of a non-ionic detergent in the course of a quarter of an hour, is rinsed and is dried.

PRINTING METHOD 3 parts of the reactive dye obtained in Example 1 are sprinkled with high-speed stirring into 100 parts of a stock thickening containing 50 parts of 5% sodium alginate thickening, 27.8 parts of water, 20 parts of urea, 1 part of sodium m-nitrobenzenesulfonate and 1.2 parts of sodium hydrogen carbonate. The print paste thus obtained is used to print a cotton fabric, and the fabric is dried and steamed at 102° C. in saturated steam for 2 minutes. The printed fabric is then rinsed, is if desired soaped off at the boil and rinsed once more, and is then dried.

What is claimed is:

1. Reactive dyes of the formula

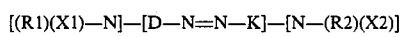

in which:

D is a benzene or naphthalene radical of a diazo component;

K is a phenyl, naphthyl or pyridyl radical of a coupling component, $R_1$ and $R_2$, independently of each other, are each hydrogen, or an unsubstituted or substituted $C_1$-$C_4$-alkyl radical, and $X_1$ and $X_2$, independently of each other, are each an unsubstituted or substituted aminofluoro-s-triazinyl radical.

2. A reactive dye of the formula

wherein:

D is a radical of a diazo component selected from the group consisting of benzene, naphthalene, 1-naphthyl-4-azobenzene, p-azonaphthylbenzene and p-azophenylbenzene, the aromatic moieties of which are unsubstituted or substituted by $C_1$-$C_4$ alkyl, $C_1$-$C_4$ alkoxy, $C_1$-$C_4$ alkanoylamino, alkoxycarbonyl with 1 to 4 carbon atoms in the alkoxy moiety, $C_1$-$C_4$ alkylsulfonyl, trifluoromethyl, nitro, cyano, halogen, carbamoyl, $C_1$-$C_4$-N-alkylcarbamoyl, sulfamoyl, $C_1$-$C_4$-N-alkylsulfamoyl, ureido, hydroxyl, carboxyl, sulfomethyl, or sulfo;

K is phenyl, naphthyl or pyridyl radical of a coupling component which is unsubstituted or substituted with $C_1$-$C_4$ alkyl, $C_1$-$C_4$ alkoxy, $C_1$-$C_4$ alkanoylamino, alkoxycarbonyl with 1 to 4 carbon atoms in the alkoxy moiety, $C_1$-$C_4$-alkylsulfonyl, trifluoromethyl, nitro, cyano, halogen, carbamoyl, $C_1$-$C_4$-N-alkylcarbamoyl, sulfamoyl, $C_1$-$C_4$-N-alkylsulfamoyl, ureido, hydroxyl, carboxyl, sulfomethyl, or sulfo; or with bridging groups selected from the group consisting of —O—, —CO—, —CH$_2$—, —CH$_2$CH$_2$—, —NHCONH—, —SO$_2$—, —NH— or —NHCO which bridge D and K to form a cyclic function;

$X_1$ and $X_2$, independently of each other, are fluoro-s-triazinyl independently substituted by $NH_2$, $NHR_3$ or $NR_3R_4$ wherein substituents $R_3$ and $R_4$ are selected from the group consisting of $C_1$-$C_6$ alkyl, cyclohexyl, phenyl, naphthyl, benzyl, phenethyl, furan, thiophene, pyrazole, pyridine, pyrimidine, quinoline, benzimidazole, benzothiazole, benzoxazole, and 6-member N-heterocyclic rings formed by joining substituents $R_3$ and $R_4$, wherein all said substituents $R_3$ and $R_4$ are unsubstituted or substituted by halogen, nitro, cyano, trifluoromethyl, sulfamoyl, carbamoyl, $C_1$-$C_4$ alkyl, $C_1$-$C_4$-alkoxy, acetylamino, benzoylamino, ureido, hydroxyl, carboxyl, sulfomethyl or sulfo;

$R_1$ and $R_2$ independently of each other, are each hydrogen, $C_1$-$C_4$ straight or branched alkyl, $C_1$-$C_4$ straight or branched alkyl substituted by halogen, cyano, hydroxyl, $C_1$-$C_4$-alkoxy, carboxyl or sulfo.

3. A reactive fiber dye of the formula

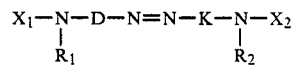

wherein D, K, $X_1$, $X_2$, $R_1$ and $R_2$ are as defined in claim 2.

4. A reactive fiber dye of the formula

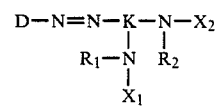

wherein D, K, $X_1$, $X_2$, $R_1$ and $R_2$ are as defined in claim 2.

5. Reactive dyes according to claim 2, in which $X_1$ and $X_2$, independently of each other, are each a radical of the formula

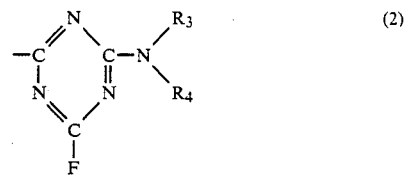

(2)

in which $R_3$ and $R_4$, independently of each other, are each hydrogen, $C_{1-4}$-alkyl which is unsubstituted or substituted by halogen, cyano, $C_{1-4}$-alkoxy, hydroxyl, carboxyl, sulfo or sulfato, benzyl, phenethyl, cyclohexyl, phenyl which is unsubstituted or substituted by halogen, nitro, cyano, trifluoromethyl, sulfamoyl, carbamoyl, $C_{1-4}$-alkyl, $C_{1-4}$-alkoxy, $C_{1-4}$-alkanoylamino, benzoylamino, ureido, hydroxyl, carboxyl, sulfomethyl or sulfo, or naphthyl which is unsubstituted or substituted by halogen, nitro, $C_{1-4}$-alkoxy, $C_{1-4}$-alkanoylamino, hydroxyl, carboxyl or sulfo, or in which $R_3$ and $R_4$, together with the amino nitrogen atom, are a morpholino, piperidino or piperazino radical.

6. Reactive dyes according to claim 5 of the formula

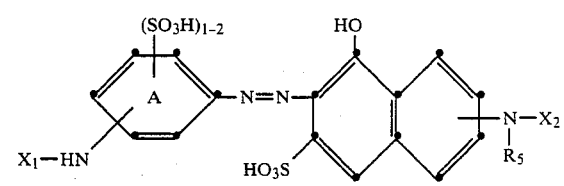

in which $R_5$ is hydrogen or $C_{1-4}$-alkyl, $X_1$ and $X_2$ are as defined in claim 2, and the benzene ring A can be further substituted by $C_1$-$C_4$ alkyl, $C_1$-$C_4$ alkoxy, $C_1$-$C_4$ alkanoylamino, alkoxycarbonyl with 1 to 4 carbon atoms in the alkoxy moiety, $C_1$-$C_4$ alkylsulfonyl, trifluoromethyl, nitro, cyano, halogen, carbamoyl, $C_1$-$C_4$-N-alkylcarbamoyl, sulfamoyl, $C_1$-$C_4$-N-alkylsulfamoyl, ureido, hydroxyl, carboxyl, sulfomethyl, or sulfo.

7. Reactive dyes according to claim 5 of the formula

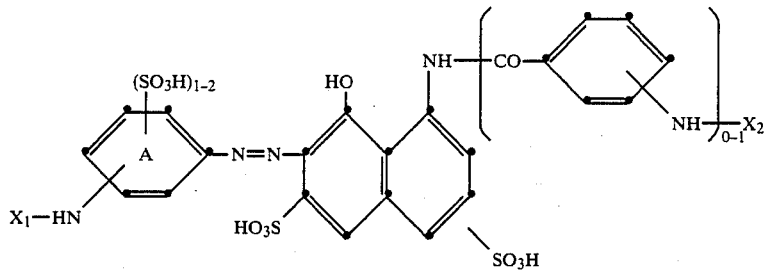

in which $X_1$ and $X_2$ are as defined under the formula (2), and the benzene ring A can be further substituted by $C_1$-$C_4$ alkyl, $C_1$-$C_4$ alkoxy, $C_1$-$C_4$ alkanoylamino, alkoxycarbonyl with 1 to 4 carbon atoms in the alkoxy moiety, $C_1$-$C_4$ alkylsulfonyl, trifluoromethyl, nitro, cyano, halogen, carbamoyl, $C_1$-$C_4$-N-alkylcarbamoyl, sulfamoyl, $C_1$-$C_4$-N-alkylsulfamoyl, ureido, hydroxyl, carboxyl, sulfomethyl, or sulfo.

8. Reactive dyes according to claim 6 in which the benzene ring A is not further substituted.

9. Reactive dyes according to claim 6 in which $R_5$ is hydrogen, methyl or ethyl.

10. Reactive dyes according to claim 7 in which the benzene ring A is not further substituted.

11. Reactive dyes according to claim 5 of the formula

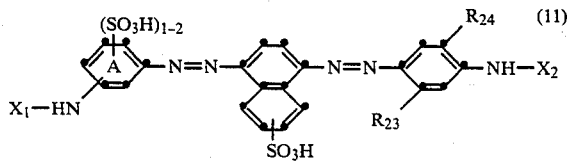

in which $R_{23}$ and $R_{24}$, independently of each other, are each hydrogen, $C_{1-4}$-alkyl, $C_{1-4}$-alkoxy, $C_{1-4}$-alkanoylamino, ureido or halogen, $X_1$-$X_2$ are as defined in claim 2, and the A benzene ring can be further substituted by $C_1$-$C_4$ alkyl, $C_1$-$C_4$ alkoxy, $C_1$-$C_4$ alkanoylamino, alkoxycarbonyl with 1 to 4 carbon atoms in the alkoxy moiety, $C_1$-$C_4$ alkylsulfonyl, trifluoromethyl, nitro, cyano, halogen, carbamoyl, $C_1$-$C_4$-N-alkylcarbamoyl, sulfamoyl, $C_1$-$C_4$-N-alkylsulfamoyl, ureido, hydroxyl, carboxyl, sulfomethyl, or sulfo.

12. Reactive dyes according to claim 11 in which the A benzene ring is not further substituted.

13. Reactive dyes according to claim 11 in which $R_{23}$ and $R_{24}$, independently of each other, are each hydrogen, methyl, ethyl, methoxy, ethoxy, acetylamino, ureido or chlorine.

14. Reactive dyes according to claim 5 in which $X_1$ and $X_2$, independently of each other, are each a radical of the formula (2) in which the amino group —$NR_3R_4$ is —$NH_2$, N-$\beta$-hydroxyethylamino, N,N-di-$\beta$-hydroxyethylamino, $\beta$-sulfoethylamino, phenylamino which is unsubstituted or substituted in the phenyl nucleus by chlorine, methyl, ethyl, methoxy, ethoxy, acetylamino, hydroxyl, carboxyl, sulfomethyl or sulfo, N-$C_{1-4}$-alkyl-N-phenylamino which is unsubstituted or substituted in the phenyl nucleus by chlorine, methyl or ethyl, N-sulfo-$C_{1-4}$-alkyl-N-phenylamino which is unsubstituted or substituted in the phenyl nucleus by chlorine, methyl or ethyl, N-hydroxy-$C_{1-4}$-alkyl-N-phenylamino or sulfonaphthylamino.

15. A process for preparing reactive dyes according to claim 1, which comprises reacting diazo components of the formula $$D-NH_2 \qquad (45)$$

or their precursors, coupling components of the formula $$H-K \qquad (46)$$

2 equivalents of 2,4,6-trifluoro-s-triazine and 2 equivalents of identical or different amines by diazotisation, coupling and condensation in suitable order to reactive dyes of the formula (1).

16. A process of dyeing or printing cellulose-containing fiber materials which comprises contacting said fiber material with a solution, dispersion or paste containing a dye of claim 2 under conditions of time and temperature effective to impart color to said fabric, subsequently rinsing off excess solution, dispersion or paste, and drying said material.

17. A process according to claim 16 wherein said material is cotton.

* * * * *